United States Patent
Pfaff et al.

(10) Patent No.: US 12,244,864 B2
(45) Date of Patent: *Mar. 4, 2025

(54) EFFICIENT IMPLEMENTATION OF MATRIX-BASED INTRA-PREDICTION

(71) Applicant: Fraunhofer-Gesellschaft zur Förderung der angewandten Forschung e.V., Munich (DE)

(72) Inventors: Jonathan Pfaff, Berlin (DE); Björn Stallenberger, Berlin (DE); Michael Schafer, Berlin (DE); Philipp Merkle, Berlin (DE); Tobias Hinz, Berlin (DE); Philipp Helle, Berlin (DE); Heiko Schwarz, Berlin (DE); Detlev Marpe, Berlin (DE); Thomas Wiegand, Berlin (DE); Benjamin Bross, Berlin (DE); Martin Winken, Berlin (DE); Mischa Siekmann, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,654

(22) Filed: May 12, 2024

(65) Prior Publication Data

US 2024/0298033 A1    Sep. 5, 2024

Related U.S. Application Data

(63) Continuation of application No. 17/763,624, filed as application No. PCT/EP2020/076697 on Sep. 24, 2020, now Pat. No. 12,022,120.

(30) Foreign Application Priority Data

Sep. 24, 2019 (EP) ..................... 19199396

(51) Int. Cl.
  *H04N 19/00* (2014.01)
  *H04N 19/105* (2014.01)
  (Continued)

(52) U.S. Cl.
  CPC ......... *H04N 19/619* (2014.11); *H04N 19/105* (2014.11); *H04N 19/132* (2014.11);
  (Continued)

(58) Field of Classification Search
  CPC .. H04N 19/619; H04N 19/105; H04N 19/132; H04N 19/159; H04N 19/176; H04N 19/46
  See application file for complete search history.

(56) References Cited

U.S. PATENT DOCUMENTS

2021/0076070 A1* 3/2021 Jung .................. H04N 19/70
2022/0060751 A1  2/2022 Nam et al.
(Continued)

FOREIGN PATENT DOCUMENTS

WO    2020200298 A1    10/2020
WO    2020226424 A1    11/2020
(Continued)

OTHER PUBLICATIONS

International Search Report and Written Opinion, dated Nov. 24, 2020, mailed in Patent Cooperation Treaty Application No. PCT/EP2020/076697, filed Sep. 24, 2020, 13 pages.
(Continued)

*Primary Examiner* — Zhihan Zhou
(74) *Attorney, Agent, or Firm* — Conley Rose, P.C.

(57) ABSTRACT

A method for decoding a predetermined block of a picture using intra-prediction by reading, for each of predetermined intra-prediction blocks, from a data stream, a mode index identifying a matrix-based intra-prediction mode is disclosed. Samples of each predetermined intra-prediction
(Continued)

block are predicted by computing a matrix-vector product between an input vector derived from reference samples and a prediction matrix associated with the identified matrix-based intra-prediction mode (k)—and associating components of an output vector obtained by the matrix-vector product onto sample positions of the predetermined block. Further predetermined intra-predicted blocks of the picture are predicted to obtain a prediction signal. A transformation flag is decoded from the data stream using context adaptive binary arithmetic coding, and a prediction residual is decoded and re-transformed using a reverse transformation based on the transformation flag to obtain a prediction residual signal. The prediction residual signal is used to correct the prediction signal.

22 Claims, 12 Drawing Sheets

(51) Int. Cl.
  *H04N 19/132* (2014.01)
  *H04N 19/159* (2014.01)
  *H04N 19/176* (2014.01)
  *H04N 19/46* (2014.01)
  *H04N 19/61* (2014.01)
(52) U.S. Cl.
  CPC ......... *H04N 19/159* (2014.11); *H04N 19/176* (2014.11); *H04N 19/46* (2014.11)

(56) References Cited

U.S. PATENT DOCUMENTS

2022/0159294 A1   5/2022   Yoo et al.
2022/0182668 A1   6/2022   Choi et al.

FOREIGN PATENT DOCUMENTS

WO   2020227405 A1   11/2020
WO   2020256391 A1   12/2020
WO   2021034158 A1    2/2021

OTHER PUBLICATIONS

Bross, Benjamin, et al., "Versatile Video Coding (Draft 5)", Joint Video Experts Team (JVET) of ITU-T SG 16 WP 3 and ISO/IEC JTC 1/SC 29/WG 11, Document: JVET-N1001-v7, 14th Meeting: Geneva, CH, Mar. 19-27, 2019.

Lin, Zhi-Yi, et al., "CE3-related: MIP with simplified mode index coding", Joint Video Experts Team (JVET) of ITU-T SG 16 WP 3 and ISO/IEC JTC 1/SC 29 WG 11, Document: JVET-O0793-v3, 15th Meeting: Gothenburg, SE, Jul. 3-12, 2019.

Wang, Biao, et al., "Non-CE3: Simplifications of Intra Mode Coding for Matrix-Based Intra Prediction", Joint Video Experts Team (JVET) of ITU-T SG 16 WP 3 and ISO/IEC JTC 1 /SC 29/WG 11, Document: JVET-O0170-v1, 15th Meeting: Gothenburg, SE, Jul. 3-12, 2019.

* cited by examiner

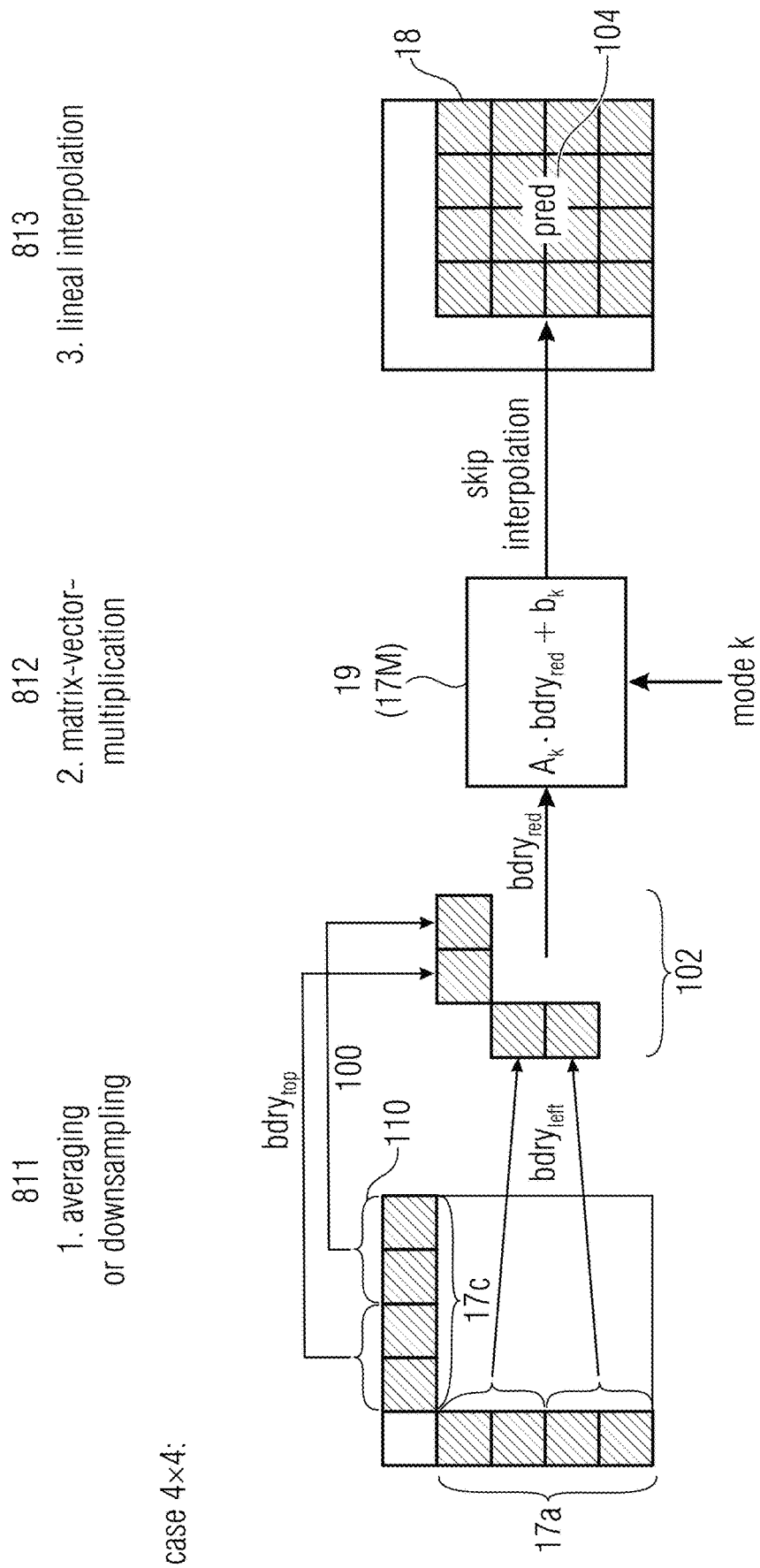
Fig. 5.1

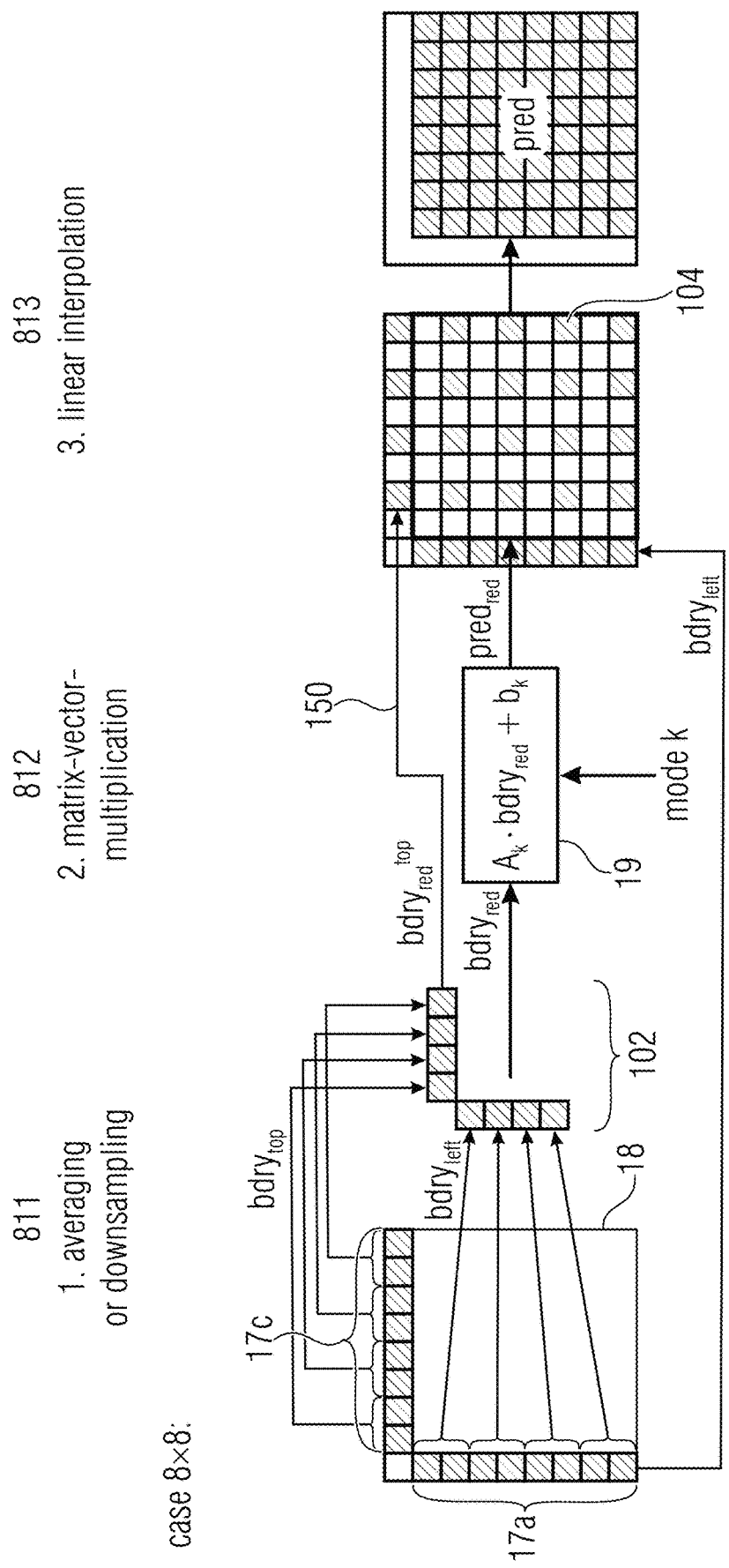
Fig. 5.2

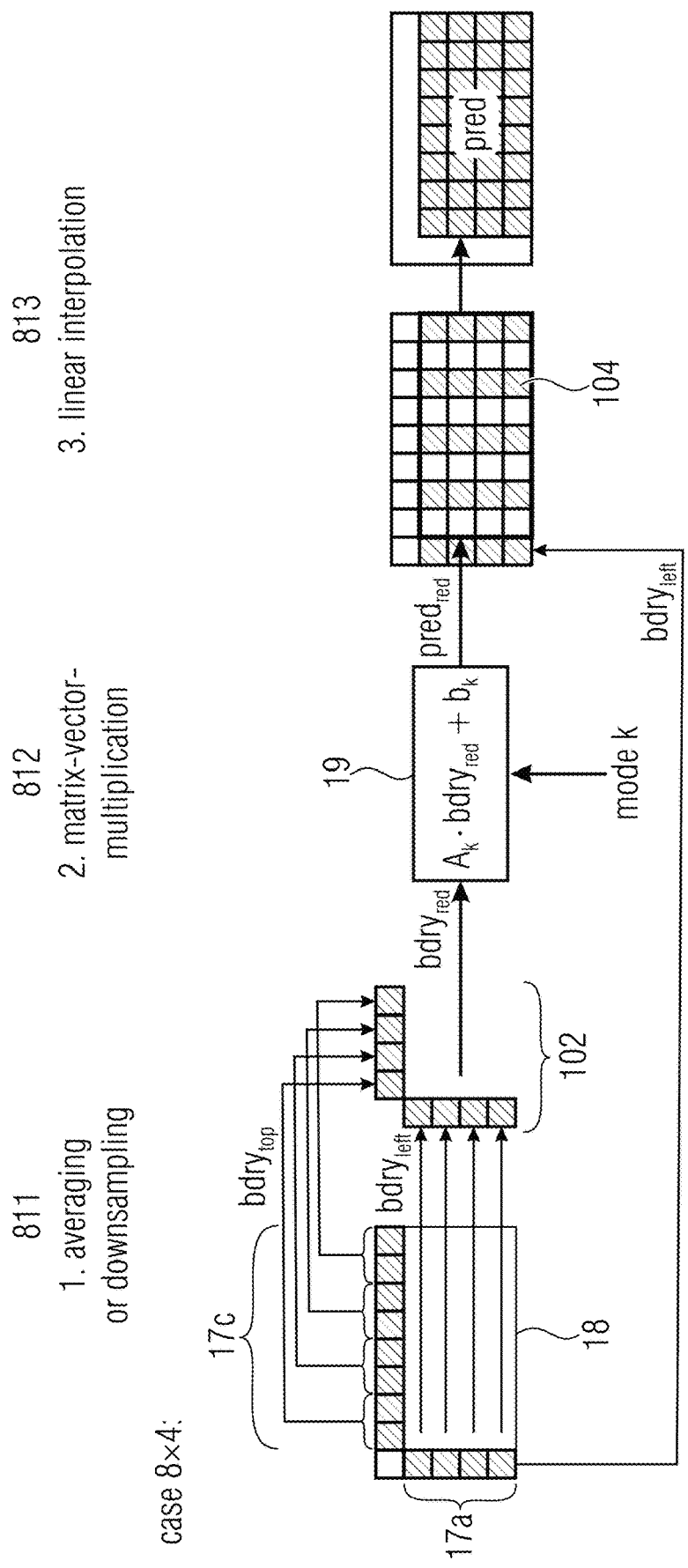

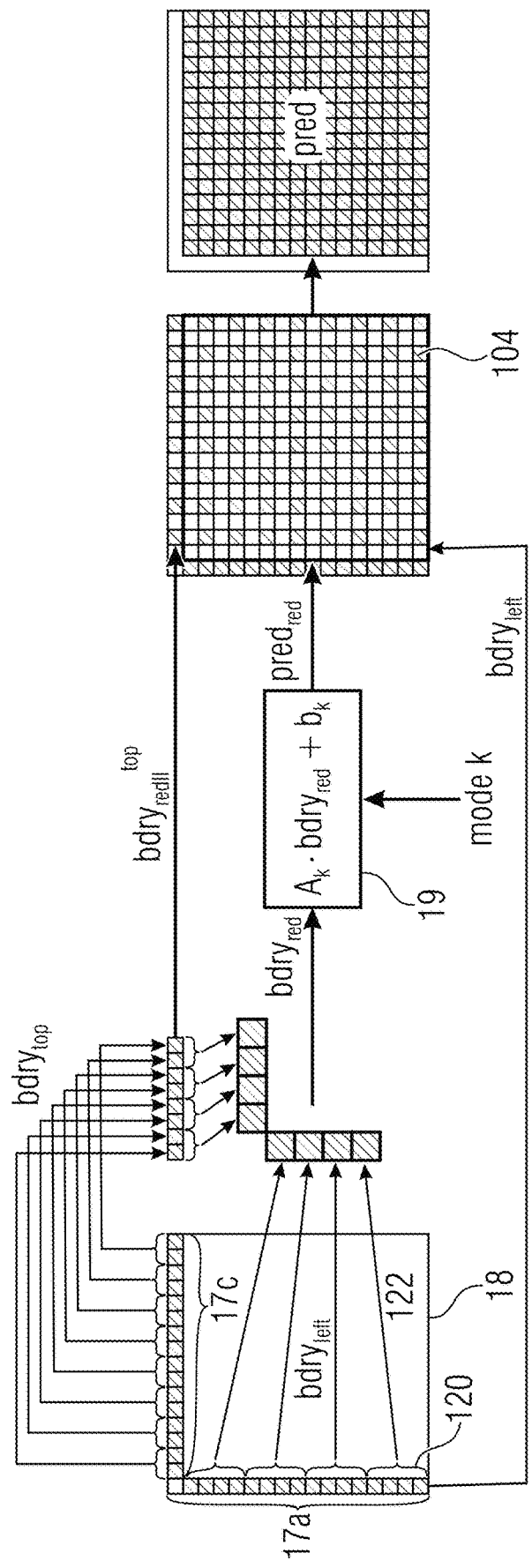
Fig. 5.4

EFFICIENT IMPLEMENTATION OF MATRIX-BASED INTRA-PREDICTION

CROSS-REFERENCE TO RELATED APPLICATION

This application is a continuation of U.S. application Ser. No. 17/763,624, filed on Mar. 24, 2022, which is continuation of and claims priority to International Application No. PCT/EP2020/076697, filed Sep. 24, 2020, and additionally claims priority from European Application No. EP 19199396.3, filed Sep. 24, 2019, all of which are incorporated herein by reference in their entirety.

TECHNICAL FIELD

Embodiments according to the invention related to apparatuses and methods for encoding or decoding a picture or a video using an efficient implementation of matrix-based intra-prediction.

BACKGROUND OF THE INVENTION

Currently, for each block of a picture on which MIP may be used, the number of MIP modes is an odd integer N=2n+1. Here, the 0-th mode may not be transposed while all other modes may be transposed: For i=n, MIP mode i is the transposed of MIP mode i−n. The 0-th mode may not be transposed due to the MIP modes being signalled by an MPM (most-probable mode) scheme with 3 MPMs, [1]. In this scheme, the total number of MIP modes is an odd integer of the form $N=2^k+3$, where k is an integer. However, at the 16-th JVET meeting in Gothenburg, the latter signalization scheme for the MIP modes was replaced by a truncated binary code, [2]. Furthermore, MIP is excluded for blocks whose aspect ratio is greater or equal to four.

Therefore, it is desired to provide concepts for rendering picture coding and/or video coding more efficient to support matrix-based intra-prediction. Additionally, or alternatively, it is desired to reduce a bit stream and thus a signalization cost.

This is achieved by the subject matter of the independent claims of the present application.

Further embodiments according to the invention are defined by the subject matter of the dependent claims of the present application.

SUMMARY OF THE INVENTION

In accordance with a first aspect of the present invention, the inventors of the present application realized that one problem encountered when trying to use matrix-based intra prediction modes (MIP-modes) for predicting samples of a predetermined block of a picture stems from the fact that it may be too costly in terms of the memory requirement to additionally store extra MIP-matrices for MIP-modes, which MIP-modes cannot be used in a transposed way. According to the first aspect of the present application, this difficulty is overcome by using a list of matrix-based intra-prediction modes with all MIP modes of the list being applicable in a transposed way reducing the number of MIP modes. The inventors found, that it is advantageous to group the MIP-modes in the list of matrix-based intra-prediction modes into pairs of matrix-based intra-prediction modes, wherein both MIP-modes of a pair of MIP-modes are associated with the same prediction matrix reducing the number of prediction matrices needed. For each pair of MIP-modes a first MIP-mode of the respective pair of MIP-modes is used in a transposed way compared to a second MIP-mode of the respective pair of MIP-modes. This is based on the idea that it is efficient to determine the MIP-mode and to determine whether the MIP-mode is used in a transposed way or not simply from a mode index. By this special grouping of the MIP-modes, it is possible to determine the transposed condition of a MIP-mode based on a parity of the MIP-mode in the list of MIP-modes. Thus it is not necessary to decode/encode additional syntax elements indicating whether the MIP-mode is to be used in a transposed way. A bit stream and thus a signalization cost may be decreased due to the mode index indicating the prediction mode as well as whether this prediction mode is to be used in a transposed way or not. By this manner, signalling a mode and its transposed mode is equally expensive in terms of VLC length. No asymmetry results. No most-probable-mode list (MPM list) construction is necessary either.

Accordingly, in accordance with a first aspect of the present application, an apparatus for decoding/encoding a predetermined block of a picture using intra-prediction, is configured to read/insert, from/into a data stream, a mode index using a binarization code. The mode index points to one out of a list of matrix-based intra-prediction modes. The apparatus is configured to predict samples of the predetermined block by computing a matrix-vector product between an input vector derived from reference samples in a neighbourhood of the predetermined block and a prediction matrix associated with the matrix-based intra-prediction mode pointed to by the mode index and associating components of an output vector obtained by the matrix-vector product onto sample positions of the predetermined block. This prediction of the samples of the predetermined block can be an affine-linear weighted intra prediction (ALWIP). The input vector may be derived from the reference samples, i.e. boundary values, by averaging reference samples and/or by taking original reference samples (see, for example, the description under item 1.4). The reference samples represent, for example, samples left of the predetermined block and samples above the predetermined block. The reference samples can be samples already decoded/encoded by the apparatus. The list of matrix-based intra-prediction modes consists of an even number of matrix-based intra-prediction modes. The list of matrix-based intra-prediction modes consists of pairs of matrix-based intra-prediction modes, and, for each pair of matrix-based intra-prediction modes, the prediction matrix associated with a first matrix-based intra-prediction mode of the respective pair of matrix-based intra-prediction modes is equal to the prediction matrix associated with a second matrix-based intra-prediction mode of the respective pair of matrix-based intra-prediction modes. At both matrix-based intra-prediction modes of a pair of matrix-based intra-prediction modes, the same prediction matrix can be used to predict the samples of the predetermined block. This means, for example, that for modes 2k and 2k+1, the same prediction matrix is used. For each pair of matrix-based intra-prediction modes, the apparatus is configured so that, if the matrix-based intra-prediction mode pointed to by the mode index is the first matrix-based intra-prediction mode of the respective pair of matrix-based intra-prediction modes, e.g. a mode with odd mode index 2k+1, an association of the reference samples in the neighbourhood of the predetermined block with components of the input vector and of the sample positions of the predetermined block with the components of the output vector is transposed relative to the association in case of the matrix-based intra-prediction mode pointed to by the mode index being the second matrix-based intra-prediction mode of the respective pair of matrix-based intra-prediction modes, e.g. a mode with even mode index 2k. That is, if a certain component of the input vector is associated with position (x,y) with (0,0) denoting the upper left corner sample of the predetermined block in the former case, then it is associated with (y,x) in the latter case. The same applies to the components of the output vector. The apparatus is configured to read/insert the mode index using the binarization code from/into the data stream in a manner so that for each pair of matrix-based intra-prediction modes the first matrix-based intra-prediction mode is assigned a first codeword and the second matrix-based intra-prediction mode is assigned a second codeword and both codewords are equal in length. Thus, the mode index might indicate the prediction matrix for the prediction of the samples of the predetermined block and at the same time might indicate whether the prediction of the samples of the predetermined block is performed in a transposed way or not.

The binarization code may be a variable length code comprising codewords of different lengths or the binarization code may be a truncated binary code, in which case the number of matrix-based intra-prediction modes is not a power of two. The truncated binary code may have codewords of different lengths.

The apparatus is, for example, configured to read/insert the mode index from/into the data stream using an equiprobability bypass mode of a context adaptive binary arithmetic decoder/encoder.

According to an embodiment, the apparatus is configured to set an inter-sample distance of the sample positions of the predetermined block and an inter-sample distance of the reference samples in the neighbourhood of the predetermined block horizontally according to a first ratio of a horizontal dimension of the predetermined block relative to a horizontal default dimension and/or vertically according to a second ratio of a vertical dimension of the predetermined block relative to a vertical default dimension. Thus, it is possible to use the MIP modes not only for quadratic blocks, but also for rectangular blocks. The apparatus might obtain predicted samples associated with a quadratic block by the matrix-based intra-prediction, for which reason the apparatus might be configured to set the inter-sample distance of the sample positions of the predicted samples to improve a reconstruction of a rectangular block, wherein the apparatus might fill spaces between the predicted samples by interpolation. Optionally, the apparatus is configured to use the list of matrix-based intra-prediction modes for a plurality of block dimensions. The apparatus may be configured to order the matrix-based intra-prediction modes in the list of matrix-based intra-prediction modes equally for the plurality of block dimensions. Alternatively, the order might be adapted to, for instance, the block being wider than high, vice versa or quadratic. The plurality of block dimensions includes, for example, at least one block dimension corresponding to an aspect-ratio of larger than 4. At least one block dimension might be associated with a predetermined block with 8×1 samples, 16×2 samples, 32×4 samples, 32×2 samples, 32×1 samples, 64×8 samples, 64×4 samples, 64×2 samples, 64×1 samples, or other blocks with an aspect-ration larger than 4.

According to an embodiment, the apparatus is configured to determine whether the matrix-based intra-prediction mode pointed to by the mode index is the first matrix-based intra-prediction mode of the respective pair of matrix-based intra-prediction modes or the second matrix-based intra-prediction mode of the respective pair of matrix-based intra-prediction modes, based on the parity of the mode index. The first matrix-based intra-prediction mode might be associated with an odd-parity and the second matrix-based intra-prediction mode might be associated with an even-parity.

According to an embodiment, the apparatus is configured to index the prediction matrix out of a plurality of prediction matrices using the integer part of the mode index divided by 2.

According to an embodiment, a last bit of the mode index read/inserted from/into the data stream indicates, whether the prediction of the samples of the predetermined block is performed in a transposed way. This bit might indicate whether the first matrix-based intra-prediction mode or the second matrix-based intra-prediction mode is to be used. This bit might be understood as the aforementioned codeword.

In accordance with a second aspect of the present invention, the inventors of the present application realized that one problem encountered when trying to use matrix-based intra prediction modes (MIP-modes) for predicting samples of a predetermined block of a picture stems from the fact that currently no MIP-modes are allowed for blocks with an aspect ratio larger than 4 resulting in a reduced flexibility at decoding/encoding a picture from/into a data stream. The inventors found, that it is possible to use the MIP-modes also for blocks with an aspect ratio larger than four. This is based on the idea that this large rectangular blocks can be efficiently downsampled/upsampled to quadratic blocks to enable a matrix-based intra-prediction to predict samples of the block and that additional samples of the block can be interpolated/extrapolated based on the predicted samples. Thus a high flexibility in block-dimensions usable for MIP-modes is achieved without increasing signalization cost or reducing a decoding efficiency.

Accordingly, in accordance with a second aspect of the present application, an apparatus for decoding/encoding a predetermined block of a picture using intra-prediction, is configured to predict each of predetermined intra-predicted blocks of the picture by reading/inserting, from/into a data stream, a mode index, the mode index pointing to one out of a list of matrix-based intra-prediction modes, and by predicting samples of the respective predetermined intra-predicted block by computing a matrix-vector product between an input vector derived from reference samples in a neighbourhood of the respective predetermined intra-predicted block and a prediction matrix associated with the matrix-based intra-prediction mode pointed to by the mode index and associating components of an output vector obtained by the matrix-vector product onto sample positions of the respective predetermined intra-predicted block. In other words, for each of predetermined intra-predicted blocks, the apparatus is configured to predict the respective block using a prediction mode pointed to by the mode index, wherein the prediction mode represents a matrix based intra-prediction, i.e. an affine-linear weighted intra prediction (ALWIP). The predetermined intra-predicted blocks comprise blocks an aspect-ratio of which is larger than 4. The predetermined intra-predicted blocks, for example, comprise 8×1 blocks, 16×2 blocks, 32×4 blocks, 32×2 blocks, 32×1 blocks, 64×8 blocks, 64×4 blocks, 64×2 blocks, 64×1 blocks, or other blocks with an aspect-ration larger than 4.

According to an embodiment, the apparatus is configured to set an inter-sample distance of the sample positions of the respective predetermined intra-predicted block and an inter-sample distance of the reference samples in the neighbourhood of the respective predetermined intra-predicted block horizontally according to a first ratio of a horizontal dimension of the predetermined block relative to a horizontal default dimension and/or vertically according to a second ratio of a vertical dimension of the predetermined block relative to a vertical default dimension.

According to an embodiment, the apparatus is configured to use the list of matrix-based intra-prediction modes for a plurality of block dimensions. Optionally, the apparatus is configured to order the matrix-based intra-prediction modes in the list of matrix-based intra-prediction modes equally for the plurality of block dimensions. Alternatively, the order might be adapted to, for instance, the block being wider than high, vice versa or quadratic.

In accordance with a third aspect of the present invention, the inventors of the present application realized that one problem encountered when trying to decode/encode a transformation flag for a block of a picture from/into a data stream stems from the fact that an efficiency for coding the syntax-element may be reduced for MIP-blocks compared to blocks not being predicted by a MIP-mode. According to the first aspect of the present application, this difficulty is overcome by using separate contexts for a Context-Based Adaptive Binary Arithmetic Coding (CABAC) of the transform flag for blocks predicted using a MIP mode and for blocks predicted not using a MIP-mode, i.e. using a planar mode, an angular mode or a DC mode. It is asserted that there is a statistical difference between the usage of a multiple transform selection (MTS) for MIP and for non-MIP blocks which can thus be exploited by separating the corresponding context. In particular, as MIP modes have to have been learned with a particular residual transform, here the default transformation, other transforms are more unlikely to yield better results than compared to heuristically designed modes such as the DC, planar and angular modes.

Thus an improved coding efficiency may be achieved by using separate contexts for MIP and non-MIP blocks.

Accordingly, in accordance with a third aspect of the present application, an apparatus for decoding/encoding a predetermined block of a picture using intra-prediction, is configured to predict each of predetermined intra-predicted blocks, e.g. matrix-based intra predicted blocks (MIP-blocks), of the picture by reading/inserting, from/into a data stream, a mode index, the mode index pointing to one out of a list of matrix-based intra-prediction modes, and by predicting samples of the respective predetermined intra-predicted block by computing a matrix-vector product between an input vector derived from reference samples in a neighbourhood of the respective predetermined intra-predicted block and a prediction matrix associated with the matrix-based intra-prediction mode pointed to by the mode index and associating components of an output vector obtained by the matrix-vector product onto sample positions of the respective predetermined intra-predicted block. The apparatus is, for example, configured to obtain a prediction signal for the respective predetermined intra predicted block by this prediction. The apparatus is configured to predict each of further predetermined intra-predicted blocks, e.g. "normal" intra blocks, of the picture using one out of a set of normal intra-prediction modes comprising an angular prediction mode, a DC prediction mode and a planar prediction mode to obtain a prediction signal. For a predetermined block out of the predetermined intra-predicted blocks and the further predetermined intra-predicted blocks, the apparatus is configured to decode/encode a transformation flag from/into the data stream, e.g. a multiple transform selection flag (MTS flag), which indicates whether a prediction residual for the predetermined block is coded into the data stream using a default transformation or a different transformation. The transform flag is coded for both MIP blocks and normal intra blocks. The apparatus is configured to decode/encode the transformation flag from/into the data stream using context adaptive binary arithmetic coding using a probability model selected depending on whether the predetermined block is one of the predetermined intra-predicted blocks or one of the further predetermined intra-predicted blocks. The apparatus is configured to decode/encode the prediction residual for the predetermined block from/into the data stream and re-transform the prediction residual using a reverse transformation which reverses the default transformation if the transformation flag indicates that the prediction residual for the predetermined block is coded into the data stream using the default transformation, and which reverses the different transformation if the transformation flag indicates that the prediction residual for the predetermined block is coded into the data stream using the different transformation, so as to obtain a prediction residual signal. The encoder is configured to perform the re-transform in the prediction loop. The apparatus is configured to correct the prediction signal using the prediction residual signal. This correction is, for example, carried out for the predetermined intra-predicted blocks and the further predetermined intra-predicted blocks.

According to an embodiment, the default transformation is a DCT-II applied horizontally and vertically.

If the transformation flag indicates that the prediction residual for the predetermined block is coded into the data stream using a different transformation, the apparatus, for example, is configured to decode/encode one or more further syntax elements from/into the data stream indicating the different transformation. The one or more further syntax elements indicate, for example, the different transformation out of a set of separable transforms using a first one of a DST-VII and a DCT-DCT-VIII horizontally and a second one of DST-VII and DCT-DCT-VIII vertically.

According to an embodiment, the apparatus is configured to, in decoding/encoding the transformation flag from/into the data stream, use as probability model for decoding/encoding the transformation flag a first probability model and update the first probability model depending on the transformation flag if the predetermined block is one of the predetermined intra-predicted blocks and use as probability model for decoding/encoding the transformation flag a second probability model and update the second probability model depending on the transformation flag if the predetermined block is one of the further predetermined intra-predicted blocks.

An embodiment is related to a method for decoding/encoding a predetermined block of a picture using intra-prediction, comprising reading/inserting, from/into a data stream, a mode index using a binarization code, the mode index pointing to one out of a list of matrix-based intra-prediction modes, and predicting samples of the predetermined block by computing a matrix-vector product between an input vector derived from reference samples in a neighbourhood of the predetermined block and a prediction matrix associated with the matrix-based intra-prediction mode pointed to by the mode index and associating components of an output vector obtained by the matrix-vector product onto sample positions of the predetermined block. The list of matrix-based intra-prediction modes consists of an even number of matrix-based intra-prediction modes. The list of matrix-based intra-prediction modes consists of pairs of matrix-based intra-prediction modes, and, for each pair of matrix-based intra-prediction modes, the prediction matrix associated with a first matrix-based intra-prediction mode of the respective pair of matrix-based intra-prediction modes is equal to the prediction matrix associated with a second matrix-based intra-prediction mode of the respective pair of matrix-based intra-prediction modes. The method comprises, if the matrix-based intra-prediction mode pointed to by the mode index is the first matrix-based intra-prediction mode of the respective pair of matrix-based intra-prediction modes, an association of the reference samples in the neighbourhood of the predetermined block with components of the input vector and of the sample positions of the predetermined block with the components of the output vector is transposed relative to the association in case of the matrix-based intra-prediction mode pointed to by the mode index being the second matrix-based intra-prediction mode of the respective pair of matrix-based intra-prediction modes. The method comprises reading/inserting the mode index using the binarization code from/into the data stream in a manner so that for each pair of matrix-based intra-prediction modes the first matrix-based intra-prediction mode is assigned a first codeword and the second matrix-based intra-prediction mode is assigned a second codeword and both codewords are equal in length.

An embodiment is related to a method for decoding/encoding a predetermined block of a picture using intra-prediction, comprising predicting each of predetermined intra-predicted blocks of the picture by reading/inserting, from/into a data stream, a mode index, the mode index pointing to one out of a list of matrix-based intra-prediction modes, and by predicting samples of the respective predetermined intra-predicted block by computing a matrix-vector product between an input vector derived from reference samples in a neighbourhood of the respective predetermined intra-predicted block and a prediction matrix associated with the matrix-based intra-prediction mode pointed to by the mode index and associating components of an output vector obtained by the matrix-vector product onto sample positions of the respective predetermined intra-predicted block. The predetermined intra-predicted blocks comprise blocks an aspect-ratio of which is larger than 4.

An embodiment is related to a method for decoding/encoding a predetermined block of a picture using intra-prediction, comprising predicting each of predetermined intra-predicted blocks, e.g. the MIP blocks, of the picture by reading/inserting, from/into a data stream, a mode index, the mode index pointing to one out of a list of matrix-based intra-prediction modes, and by predicting samples of the respective predetermined intra-predicted block by computing a matrix-vector product between an input vector derived from reference samples in a neighbourhood of the respective predetermined intra-predicted block and a prediction matrix associated with the matrix-based intra-prediction mode pointed to by the mode index and associating components of an output vector obtained by the matrix-vector product onto sample positions of the respective predetermined intra-predicted block. Furthermore, the method comprises predicting each of further predetermined intra-predicted blocks of the picture using one out of a set of normal intra-prediction modes comprising an angular prediction mode, a DC prediction mode and a planar prediction mode to obtain a prediction signal. For a predetermined block out of the predetermined intra-predicted blocks and the further predetermined intra-predicted blocks, the method comprises decoding/encoding a transformation flag from/into the data stream which indicates whether a prediction residual for the predetermined block is coded into the data stream using a default transformation or a different transformation, decoding/encoding the prediction residual for the predetermined block from/into the data stream, re-transforming the prediction residual using a reverse transformation which reverses the default transformation if the transformation flag indicates that the prediction residual for the predetermined block is coded into the data stream using the default transformation, and which reverses the different transformation if the transformation flag indicates that the prediction residual for the predetermined block is coded into the data stream using the different transformation, so as to obtain a prediction residual signal, and correcting the prediction signal using the prediction residual signal. The method comprises decoding/encoding the transformation flag from/into the data stream using context adaptive binary arithmetic coding using a probability model selected depending on whether the predetermined block is one of the predetermined intra-predicted blocks or one of further predetermined intra-predicted blocks.

An embodiment is related to a data stream having a picture or a video encoded thereinto using a herein described method for encoding.

An embodiment is related to a computer program having a program code for performing, when running on a computer, a herein described method.

BRIEF DESCRIPTION OF THE DRAWINGS

The drawings are not necessarily to scale, emphasis instead generally being placed upon illustrating the principles of the invention. In the following description, various embodiments of the invention are described with reference to the following drawings, in which:

FIG. 5.1 shows a prediction of a block with a reduced sample value vector according to an embodiment;

FIG. 5.2 shows a prediction of a block using an interpolation of samples according to an embodiment;

FIG. 5.3 shows a prediction of a block with a reduced sample value vector, wherein only some boundary samples are averaged, according to an embodiment;

FIG. 5.4 shows a prediction of a block with a reduced sample value vector, wherein groups of four boundary samples are averaged, according to an embodiment;

DETAILED DESCRIPTION OF THE EMBODIMENTS

Figure 1:
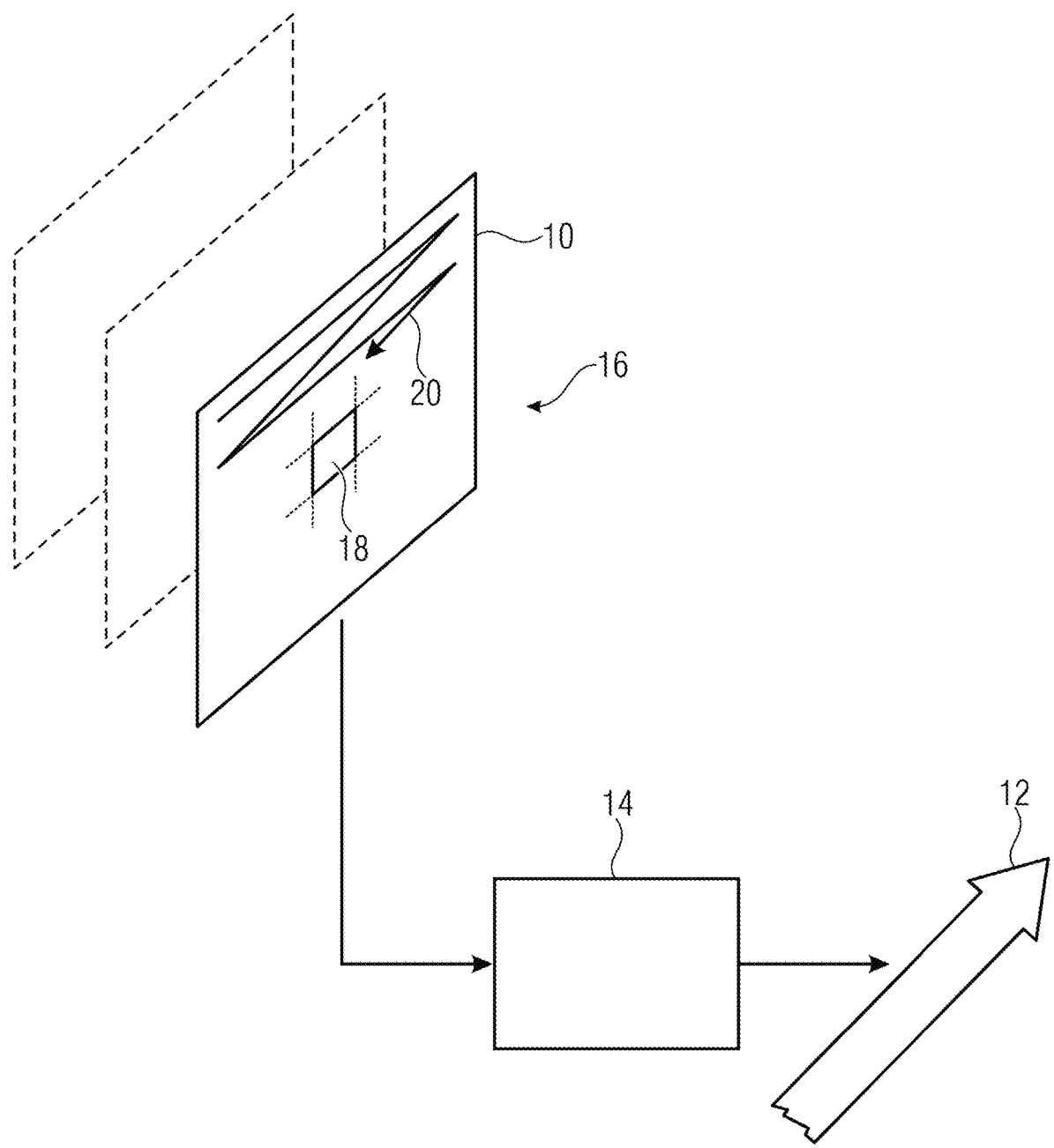
FIG. 1 shows an embodiment of an encoding into a data stream.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

In the following, various examples are described which may assist in achieving a more effective compression when using matrix-based intra prediction. The matrix-based intra prediction may be added to other intra-prediction modes heuristically designed, for instance, or may be provided exclusively.

In order to ease the understanding of the following examples of the present application, the description starts with a presentation of possible encoders and decoders fitting thereto into which the subsequently outlined examples of the present application could be built. FIG. 1 shows an apparatus for block-wise encoding a picture 10 into a datastream 12. The apparatus is indicated using reference sign 14 and may be a still picture encoder or a video encoder. In other words, picture 10 may be a current picture out of a video 16 when the encoder 14 is configured to encode video 16 including picture 10 into datastream 12, or encoder 14 may encode picture 10 into datastream 12 exclusively.

As mentioned, encoder 14 performs the encoding in a block-wise manner or block-base. To this, encoder 14 subdivides picture 10 into blocks, units of which encoder 14 encodes picture 10 into datastream 12. Examples of possible subdivisions of picture 10 into blocks 18 are set out in more detail below. Generally, the subdivision may end-up into blocks 18 of constant size such as an array of blocks arranged in rows and columns or into blocks 18 of different block sizes such as by use of a hierarchical multi-tree subdivisioning with starting the multi-tree subdivisioning from the whole picture area of picture 10 or from a pre-partitioning of picture 10 into an array of tree blocks wherein these examples shall not be treated as excluding other possible ways of subdivisioning picture 10 into blocks 18.

Further, encoder 14 is a predictive encoder configured to predictively encode picture 10 into datastream 12. For a certain block 18 this means that encoder 14 determines a prediction signal for block 18 and encodes the prediction residual, i.e. the prediction error at which the prediction signal deviates from the actual picture content within block 18, into datastream 12.

Encoder 14 may support different prediction modes so as to derive the prediction signal for a certain block 18. The prediction modes, which are of importance in the following examples, are intra-prediction modes according to which the inner of block 18 is predicted spatially from neighboring, already encoded samples of picture 10. The encoding of picture 10 into datastream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf notes within a block of a certain hierarchy level may precede blocks of the same hierarchy level having the same parent block according to coding order 20. Depending on the coding order 20, neighboring, already encoded samples of a block 18 may be located usually at one or more sides of block 18. In case of the examples presented herein, for instance, neighboring, already encoded samples of a block 18 are located to the top of, and to the left of block 18.

Intra-prediction modes may not be the only ones supported by encoder 14. In case of encoder 14 being a video encoder, for instance, encoder 14 may also support inter-prediction modes according to which a block 18 is temporarily predicted from a previously encoded picture of video 16. Such an inter-prediction mode may be a motion-compensated prediction mode according to which a motion vector is signaled for such a block 18 indicating a relative spatial offset of the portion from which the prediction signal of block 18 is to be derived as a copy. Additionally or alternatively, other non-intra-prediction modes may be available as well such as inter-view prediction modes in case of encoder 14 being a multi-view encoder, or non-predictive modes according to which the inner of block 18 is coded as is, i.e. without any prediction.

Figure 2:
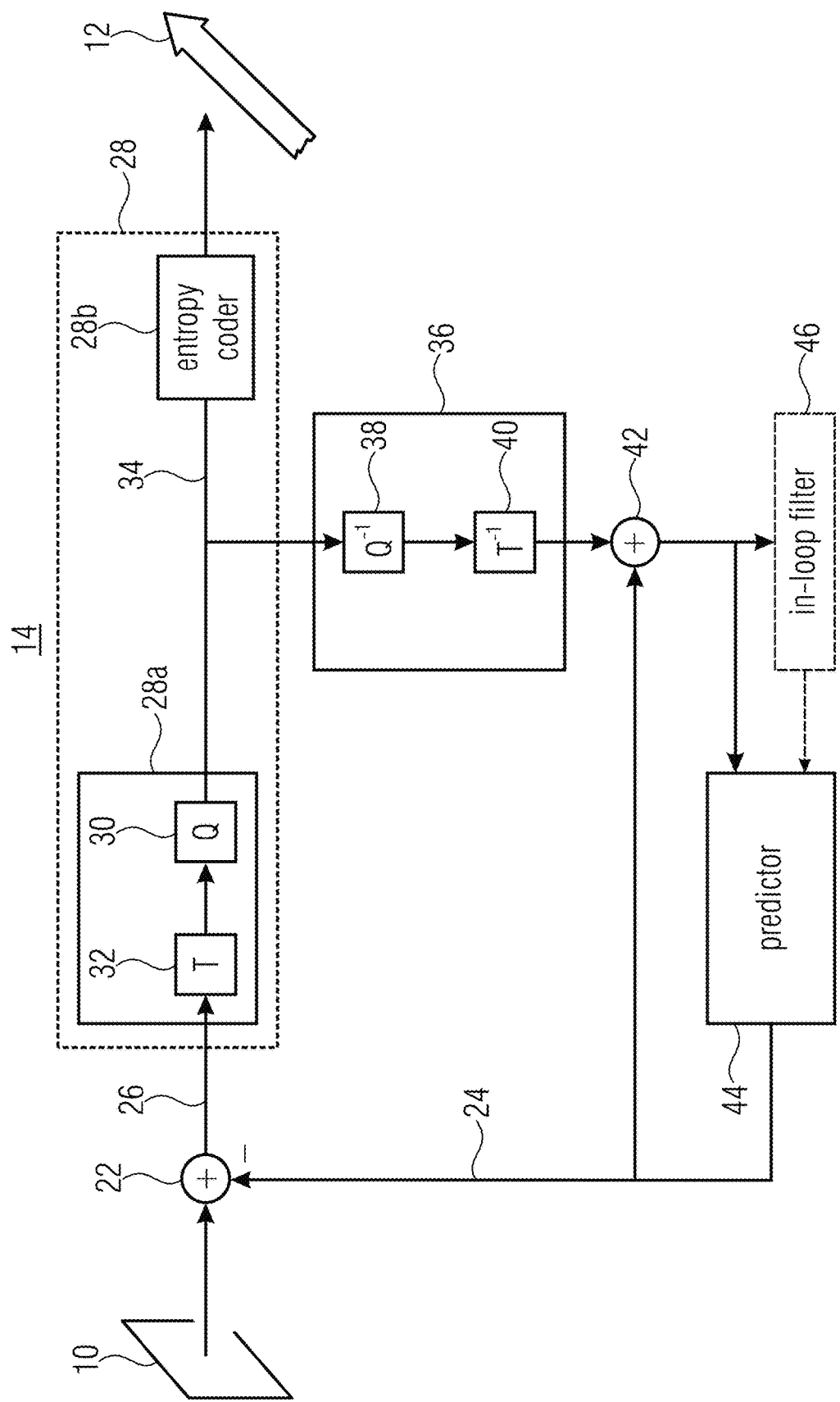
FIG. 2 shows an embodiment of an encoder.

Before starting with focusing the description of the present application onto intra-prediction modes, a more specific example for a possible block-based encoder, i.e. for a possible implementation of encoder 14, as described with respect to FIG. 2 with then presenting two corresponding examples for a decoder fitting to FIGS. 1 and 2, respectively.

FIG. 2 shows a possible implementation of encoder 14 of FIG. 1, namely one where the encoder is configured to use transform coding for encoding the prediction residual although this is nearly an example and the present application is not restricted to that sort of prediction residual coding. According to FIG. 2, encoder 14 comprises a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a datastream 12. The prediction residual encoder 28 is composed of a lossy encoding stage 28a and a lossless encoding stage 28b. The lossy stage 28a receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28a comprises a transform stage 32 connected between subtractor 22 and quantizer 30 so as to transform such a spectrally decomposed prediction residual 26 with a quantization of quantizer 30 taking place on the transformed coefficients where presenting the residual signal 26. The transform may be a DCT, DST, FFT, Hadamard transform or the like. The transformed and quantized prediction residual signal 34 is then subject to lossless coding by the lossless encoding stage 28b which is an entropy coder entropy coding quantized prediction residual signal 34 into datastream 12. Encoder 14 further comprises the prediction residual signal reconstruction stage 36 connected to the output of quantizer 30 so as to reconstruct from the transformed and quantized prediction residual signal 34 the prediction residual signal in a manner also available at the decoder, i.e. taking the coding loss is quantizer 30 into account. To this end, the prediction residual reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. Encoder 14 comprises an adder 42 which adds the reconstructed prediction residual signal as output by inverse transformer 40 and the prediction signal 24 so as to output a reconstructed signal, i.e. reconstructed samples. This output is fed into a predictor 44 of encoder 14 which then determines the prediction signal 24 based thereon. It is predictor 44 which supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

As already mentioned above, encoder 14 operates block-based. For the subsequent description, the block bases of interest is the one subdividing picture 10 into blocks for which the intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, it is decided as to which supported intra-prediction mode should be used for the respective prediction block. These prediction blocks will form blocks 18 which are of interest here. Prediction blocks within coding blocks associated with inter-prediction would be treated differently by predictor 44. They would be inter-predicted from reference pictures by determining a motion vector and copying the prediction signal for this block from a location in the reference picture pointed to by the motion vector. Another block subdivisioning pertains the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning, and prediction blocks and/or transform blocks may be obtained by further subdividing coding blocks using multi-tree subdivisioning, as well.

Figure 3:
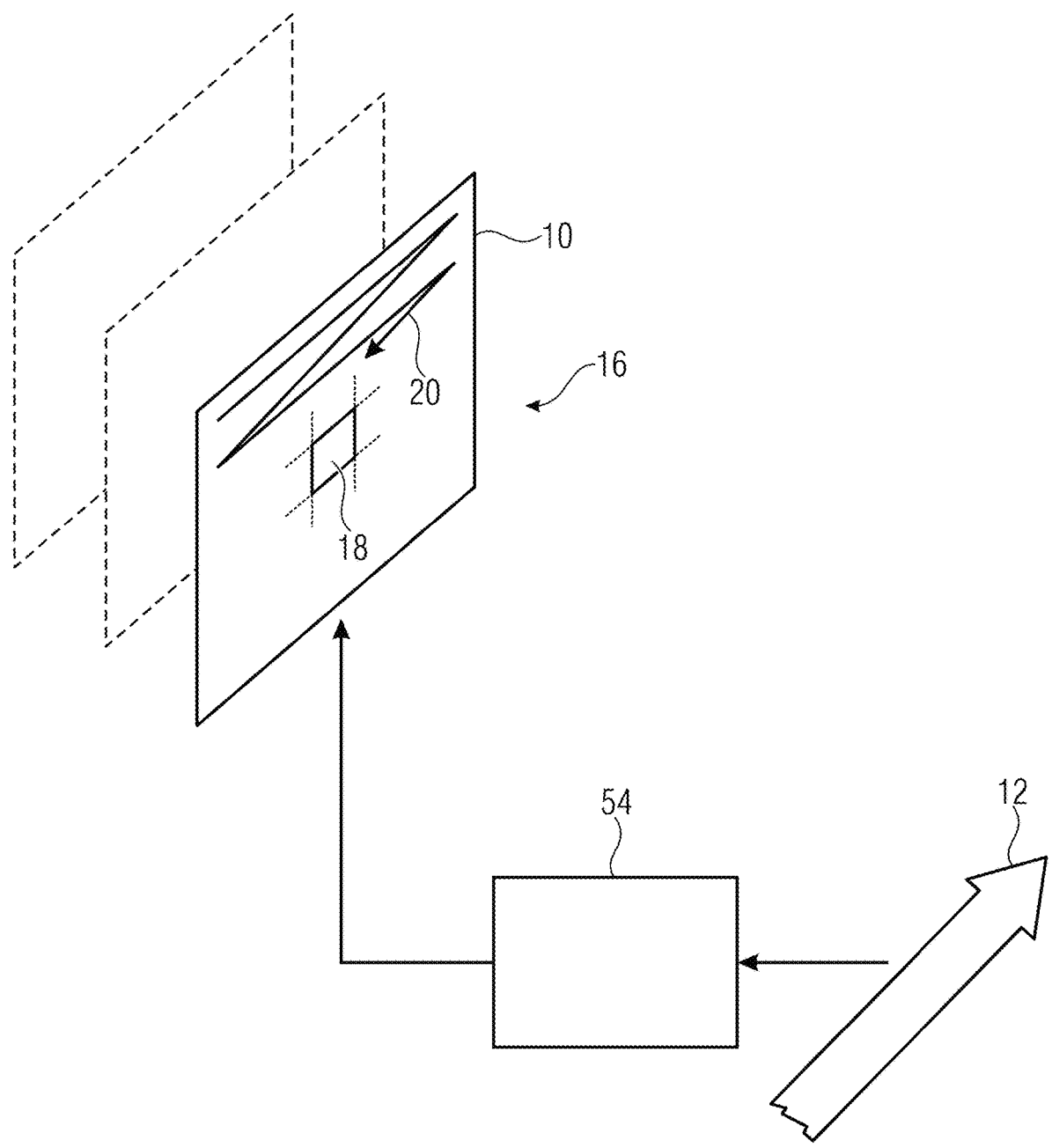
FIG. 3 shows an embodiment of a reconstruction of a picture.

A decoder 54 or apparatus for block-wise decoding fitting to the encoder 14 of FIG. 1 is depicted in FIG. 3. This decoder 54 does the opposite of encoder 14, i.e. it decodes from datastream 12 picture 10 in a block-wise manner and supports, to this end, a plurality of intra-prediction modes. The decoder 54 may comprise a residual provider 156, for example. All the other possibilities discussed above with respect to FIG. 1 are valid for the decoder 54, too. To this, decoder 54 may be a still picture decoder or a video decoder and all the prediction modes and prediction possibilities are supported by decoder 54 as well. The difference between encoder 14 and decoder 54 lies, primarily, in the fact that encoder 14 chooses or selects coding decisions according to some optimization such as, for instance, in order to minimize some cost function which may depend on coding rate and/or coding distortion. One of these coding options or coding parameters may involve a selection of the intra-prediction mode to be used for a current block 18 among available or supported intra-prediction modes. The selected intra-prediction mode may then be signaled by encoder 14 for current block 18 within datastream 12 with decoder 54 redoing the selection using this signalization in datastream 12 for block 18. Likewise, the subdivisioning of picture 10 into blocks 18 may be subject to optimization within encoder 14 and corresponding subdivision information may be conveyed within datastream 12 with decoder 54 recovering the subdivision of picture 10 into blocks 18 on the basis of the subdivision information. Summarizing the above, decoder 54 may be a predictive decoder operating on a block-bases and besides intra-prediction modes, decoder 54 may support other prediction modes such as inter-prediction modes in case of, for instance, decoder 54 being a video decoder. In decoding, decoder 54 may also use the coding order 20 discussed with respect to FIG. 1 and as this coding order 20 is obeyed both at encoder 14 and decoder 54, the same neighboring samples are available for a current block 18 both at encoder 14 and decoder 54. Accordingly, in order to avoid unnecessary repetition, the description of the mode of operation of encoder 14 shall also apply to decoder 54 as far the subdivision of picture 10 into blocks is concerned, for instance, as far as prediction is concerned and as far as the coding of the prediction residual is concerned. Differences lie in the fact that encoder 14 chooses, by optimization, some coding options or coding parameters and signals within, or inserts into, datastream 12 the coding parameters which are then derived from the datastream 12 by decoder 54 so as to redo the prediction, subdivision and so forth.

Figure 4:
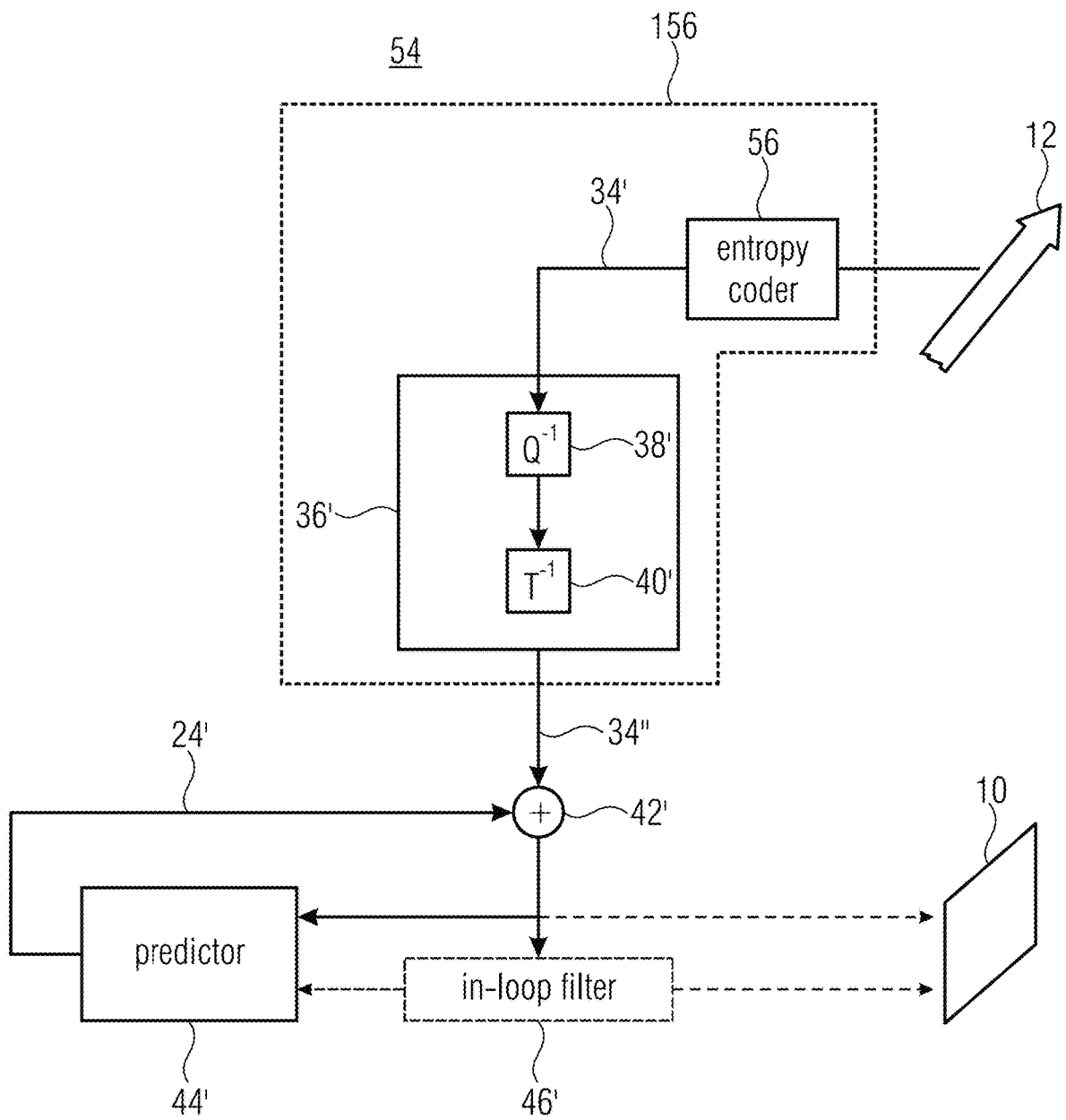
FIG. 4 shows an embodiment of a decoder.

FIG. 4 shows a possible implementation of the decoder 54 of FIG. 3, namely one fitting to the implementation of encoder 14 of FIG. 1 as shown in FIG. 2. As many elements of the encoder 54 of FIG. 4 are the same as those occurring in the corresponding encoder of FIG. 2, the same reference signs, provided with an apostrophe, are used in FIG. 4 in order to indicate these elements. In particular, adder 42', optional in-loop filter 46' and predictor 44' are connected into a prediction loop in the same manner that they are in encoder of FIG. 2. The reconstructed, i.e. dequantized and retransformed prediction residual signal applied to added 42' is derived by a sequence of entropy decoder 56 which inverses the entropy encoding of entropy encoder 28b, followed by the residual signal reconstruction stage 36' which is composed of dequantizer 38' and inverse transformer 40' just as it is the case on encoding side. The decoder's output is the reconstruction of picture 10. The reconstruction of picture 10 may be available directly at the output of adder 42' or, alternatively, at the output of in-loop filter 46'. Some post-filter may be arranged at the decoder's output in order to subject the reconstruction of picture 10 to some post-filtering in order to improve the picture quality, but this option is not depicted in FIG. 4.

Again, with respect to FIG. 4 the description brought forward above with respect to FIG. 2 shall be valid for FIG. 4 as well with the exception that merely the encoder performs the optimization tasks and the associated decisions with respect to coding options. However, all the description with respect to block-subdivisioning, prediction, dequantization and retransforming is also valid for the decoder 54 of FIG. 4.

The embodiments described below make use of a so-called matrix-based intra-prediction. The general concept shall be outlined below. The concept is sometimes called ALWIP (Affine-linear weighted intra prediction) in the following, as an alternative synonym for MIP (Matrix-based Intra Prediction).

In ALWIP or MIP mode, for predicting the samples of a rectangular block of width W and height H, Affine-linear weighted intra prediction (ALWIP) (or MIP) may take one line of H reconstructed neighbouring boundary samples left of the block and one line of W reconstructed neighbouring boundary samples above the block as input. If the reconstructed samples are unavailable, they may be generated as it is done in the conventional intra prediction. The FIGS. 5.1 to 5.4 show matrix-based intra-prediction of samples 104 of a predetermined block 18.

A generation of the prediction signal (e.g., the values for the complete block 18) may be based on at least some of the following three steps:

1. Out of the boundary samples 17, samples 102 (e.g., four samples in the case of W=H=4 and/or eight samples in other case) may be extracted by averaging or downsampling (e.g., step 811). It is possible to reduce, at step 811, the number of samples 17a and 17c neighboring the block 18. As shown, e.g. at 100 in FIG. 5.1, after having subdivided the row 17c and the column 17a in groups 110 of two samples each, one single sample might be maintained per group 110 (e.g., the average of the samples of the group 110 or a simple choice among the samples of the group 110). Or as shown, e.g. at 122 in FIG. 5.4, the boundary samples may be grouped into groups 120 of four consecutive samples, wherein in this case also only one sample might be maintained per group 120 (e.g., selected among the four samples, or the average of the four samples).
2. A matrix vector multiplication, followed by addition of an offset, may be carried out with the averaged samples (or the samples remaining from downsampling) as an input. The result may be a reduced prediction signal on a subsampled set of samples in the original block. (e.g., step 812)
3. The prediction signal at the remaining position may be generated, e.g. by upsampling, from the prediction signal on the subsampled set, e.g., by linear interpolation (e.g., step 813).

Thanks to steps 1. (811) and/or 3. (813), the total number of multiplications needed in the computation of the matrix-vector product may be such that it is always smaller or equal than 4*W*H. Moreover, the averaging operations on the boundary and the linear interpolation of the reduced prediction signal are carried out by solely using additions and bit-shifts. In other words, for example, at most four multiplications per sample are needed for the ALWIP modes.

In some examples, the matrices (e.g., 17M) and offset vectors (e.g., $b_k$) needed to generate the prediction signal may be taken from sets (e.g., three sets), e.g., $S_0$, $S_1$, $S_2$, of matrices which may be stored, for example, in storage unit(s) of the decoder and of the encoder.

In some examples the set $S_0$ may comprise (e.g., consist of) $n_0$ (e.g., $n_0=16$ or $n_0=18$ or another number) matrices $A_0^i$, $i \in \{0, \ldots, n_0-1\}$ each of which may have 16 rows and 4 columns and 18 offset vectors $b_0^i$, $i \in \{0, \ldots, n_0-1\}$ each of size 16 to perform the technique according to FIG. 5.1. Matrices and offset vectors of this set are used for blocks 18 of size 4×4. Once the boundary vector has been reduced to a $P_{red}=4$ vector (as for step 811 of FIG. 5.1), it is possible to map the $P_{red}=4$ samples of the reduced set of samples 102 directly into the Q=16 samples of the 4×4 block 18 to be predicted.

In some examples, the set $S_1$ may comprise (e.g., consist of) $n_1$ (e.g., $n_1=8$ or $n_1=18$ or another number) matrices $A_1^i$, $i \in \{0, \ldots, n_1-1\}$, each of which may have 16 rows and 8 columns and 18 offset vectors $b_1^i$, $i \in \{0, \ldots, n_1-1\}$ each of size 16 to perform the technique according to FIG. 5.2 or 5.3. Matrices and offset vectors of this set $S_1$ may be used for blocks of sizes 4×8, 4×16, 4×32, 4×64, 16×4, 32×4, 64×4, 8×4 and 8×8. Additionally, it may also be used for blocks of size W×H with max(W,H)=4 and min(W,H)=4, i.e. for blocks of size 4×16 or 16×4, 4×32 or 32×4 and 4×64 or 64×4. The 16×8 matrix refers to the reduced version of the block 18, which is a 4×4 block, as obtained in FIGS. 5.2 and 5.3.

Additionally or alternatively, the set $S_2$ may comprise (e.g., consists of) $n_2$ (e.g., $n_2=6$ or $n_2=18$ or another number) matrices $A_2^i$, $i \in \{0, \ldots, n_2-1\}$, each of which may have 64 rows and 8 columns and of 18 offset vectors $b_2^i$, $i \in \{0, \ldots, n_2-1\}$ of size 64. The 64×8 matrix refers to the reduced version of the block 18, which is an 8×8 block, e.g. as obtained in FIG. 5.4. Matrices and offset vectors of this set may be used for blocks of sizes 8×16, 8×32, 8×64, 16×8, 16×16, 16×32, 16×64, 32×8, 32×16, 32×32, 32×64, 64×8, 64×16, 64×32, 64×64.

Matrices and offset vectors of that set or parts of these matrices and offset vectors may be used for all other block-shapes.

1.1 Averaging or Downsampling of the Boundary

Here, features are provided regarding step 811.

The boundary samples (17a, 17c) may be averaged and/or downsampled (e.g., from P samples to $P_{red}<P$ samples).

In a first step, the input boundaries $bdry^{top}$ (e.g., 17c) and $bdry^{left}$ (e.g., 17a) may be reduced to smaller boundaries $bdry_{red}^{top}$ and $bdry_{red}^{left}$ to arrive at the reduced set 102. Here, $bdry_{red}^{top}$ and $bdry_{red}^{left}$ both consists of 2 samples in the case of a 4×4-block and both consist of 4 samples in other cases.

In the case of a 4×4-block, it is possible to define $$bdry_{red}^{top}[0] = (bdry^{top}[0] + bdry^{top}[1] + 1) >> 1,$$

$$bdry_{red}^{top}[1] = (bdry^{top}[2] + bdry^{top}[3] + 1) >> 1,$$

and define $bdry_{red}^{left}$ analogously. Accordingly, $bdry_{red}^{top}[0]$, $bdry_{red}^{top}[1]$, $bdry_{red}^{left}[0]$ $bdry_{red}^{left}[1]$ are average values obtained e.g. using bit-shifting operations.

In all other cases (e.g., for blocks of wither width or height different from 4), if the block-width W is given as $W=4*2^k$, for $0 \leq i < 4$ one defines $$bdry_{red}^{top}[i] = \left(\left(\sum_{j=0}^{2^k-1} bdry^{top}[i*2^k + j]\right) + 1 << (k-1)\right) >> k.$$

and defines $bdry_{red}^{left}$ analogously.

In still other cases, it is possible to downsample the boundary (e.g., by selecting one particular boundary sample from a group of boundary samples) to arrive at a reduce number of samples. For example, $bdry_{red}^{top}[0]$ may be chosen among $bdry^{top}[0]$ and $bdry^{top}[1]$, and $bdry_{red}^{top}[1]$ may be chosen among $bdry^{top}[2]$ and $bdry^{top}[3]$. It is also possible to define $bdry_{red}^{left}$ analogously.

The two reduced boundaries $bdry_{red}^{top}$ and $bdry_{red}^{left}$ a may be concatenated to a reduced boundary vector $bdry_{red}$ (associated to the reduced set 102), also indicated with 17P. The reduced boundary vector bdry$_{red}$ may be thus of size four (P$_{red}$=4) for blocks of shape 4×4 (example of FIG. 5.1) and of size eight (P$_{red}$=8) for blocks of all other shapes (examples of FIG. 5.2-5.4).

Here, if mode <18 (or the number of matrixes in the set of matrixes), it is possible to define $$bdry_{red} = [bdry_{red}^{top}, bdry_{red}^{left}]$$

If mode ≥18, which corresponds to the transposed mode of mode −17, it is possible to define $$bdry_{red} = [bdry_{red}^{left}, bdry_{red}^{top}]$$

Hence, according to a particular state (one state: mode <18; one other state: mode ≥18) it is possible to distribute the predicted values of the output vector along a different scan order (e.g., one scan order: [bdry$_{red}^{top}$, bdry$_{red}^{left}$]; one other scan order: [bdry$_{red}^{left}$, bdry$_{red}^{top}$]).

Other strategies may be carried out. In other examples, the mode index 'mode' is not necessarily in the range 0 to 35 (other ranges may be defined). Further, it is not necessary that each of the three sets $S_0$, $S_1$, $S_2$ has 18 matrices (hence, instead of expressions like mode ≥18, it is possible to mode ≥$n_0$, $n_1$, $n_2$, which are the number of matrixes for each set of matrixes $S_0$, $S_1$, $S_2$, respectively). Further, the sets may have different numbers of matrixes each (for example, it may be that $S_0$ has 16 matrixes $S_1$ has eight matrixes, and $S_2$ has six matrixes).

The mode and transposed information are not necessarily stored and/or transmitted as one combined mode index 'mode': in some examples there is the possibility of signalling explicitly as a transposed flag and the matrix index (0-15 for $S_0$, 0-7 for $S_1$ and 0-5 for $S_2$).

In some cases, the combination of the transposed flag and matrix index may be interpreted as a set index or mode index. For example, there may be one bit operating as transposed flag, and some bits indicating the matrix index, collectively indicated as "set index" or "mode index".

1.2 Generation of the Reduced Prediction Signal by Matrix Vector Multiplication Here, features are provided regarding step 812.

Out of the reduced input vector bdry$_{red}$ (boundary vector 17P) one may generate a reduced prediction signal pred$_{red}$. The latter signal may be a signal on the downsampled block of with W$_{red}$ and height H$_{red}$. Here, W$_{red}$ and H$_{red}$ may be defined as:

$$W_{red} = 4, H_{red} = 4; \quad \text{if } \max(W, H) \le 8,$$

$$W_{red} = \min(W, 8), H_{red} = \min(H, 8); \quad \text{else.}$$

The reduced prediction signal pred$_{red}$ may be computed by calculating a matrix vector-product and adding an offset:

$$pred_{red} = A \cdot bdry_{red} + b.$$

Here, A is a matrix (e.g., prediction matrix 17M) that may have W$_{red}$*H$_{red}$ rows and 4 columns if W=H=4 and 8 columns in all other cases and b is a vector that may be of size W$_{red}$*H$_{red}$.

If W=H=4, then A may have 4 columns and 16 rows and thus 4 multiplications per sample may be needed in that case to compute predred. In all other cases, A may have 8 columns and one may verify that in these cases one has 8*W$_{red}$*H$_{red}$≤4*W*H, i.e. also in these cases, at most 4 multiplications per sample are needed to compute predred.

The matrix A and the vector b may be taken from one of the sets $S_0$, $S_1$, $S_2$ as follows. One defines an index idx=idx (W,H) by setting idx(W,H)=0, if W=H=4, idx(W,H)=1, if max(W,H)=8 and idx(W,H)=2 in all other cases. Moreover, one may put m=mode, if mode <18 and m=mode−17, else. Then, if idx≤1 or idx=2 and min(W,H)=4, one may put A=A$_{idx}^m$ and b=b$_{idx}^m$. In the case that idx=2 and min(W,H)=4, one lets A be the matrix that arises by leaving out every row of A$_{idx}^m$, that, in the case W=4, corresponds to an odd x-coordinate in the downsampled block, or, in the case H=4, corresponds to an odd y-coordinate in the downsampled block. If mode ≥18, one replaces the reduced prediction signal by its transposed signal. In alternative examples, different strategies may be carried out. For example, instead of reducing the size of a larger matrix ("leave out"), a smaller matrix of $S_1$ (idx=1) with W$_{red}$=4 and H$_{red}$=4 is used. I.e., such blocks are now assigned to $S_1$ instead of $S_2$.

Other strategies may be carried out. In other examples, the mode index 'mode' is not necessarily in the range 0 to 35 (other ranges may be defined). Further, it is not necessary that each of the three sets $S_0$, $S_1$, $S_2$ has 18 matrices (hence, instead of expressions like mode <18, it is possible to mode <$n_0$, $n_1$, $n_2$, which are the number of matrixes for each set of matrixes $S_0$, $S_1$, $S_2$, respectively). Further, the sets may have different numbers of matrixes each (for example, it may be that $S_0$ has 16 matrixes $S_1$ has eight matrixes, and $S_2$ has six matrixes).

1.3 Linear Interpolation to Generate the Final Prediction Signal

Here, features are provided regarding step 812.

Interpolation of the subsampled prediction signal, on large blocks a second version of the averaged boundary may be needed. Namely, if min(W,H)=8 and W=H, one writes W=8*$2^l$, and for 0≤i<8 defines $$bdry_{redII}^{top}[i] = \left(\left(\sum_{j=0}^{2^l - 1} bdry^{top}[i * 2^l + j]\right) + 1 << (l - 1)\right) >> l.$$

If min(W,H)=8 and H=W, one defines bdryred analogously.

In addition or alternative, it is possible to have a "hard downsampling", in which the bdry$_{redII}^{top}$[i] is equal to $$bdry_{redII}^{top}[i] = bdry^{top}[(i+1) * 2^l - 1].$$

Also, bdry$_{redII}^{left}$ can be defined analogously.

At the sample positions that were left out in the generation of pred$_{red}$ (e.g., step 813 in examples of FIGS. 5.2-5.4), the final prediction signal may arise by linear interpolation from pred$_{red}$. This linear interpolation may be unnecessary, in some examples if W=H=4 (e.g., example of FIG. 5.1).

The linear interpolation may be given as follows (other examples are notwithstanding possible). It is assumed that W=H. Then, if H=H$_{red}$, a vertical upsampling of predred may be performed. In that case, pred$_{red}$ may be extended by one line to the top as follows. If W=8, pred$_{red}$ may have width W$_{red}$=4 and may be extended to the top by the averaged boundary signal bdry$_{red}^{top}$, e.g. as defined above.

If W=8, $pred_{red}$ is of width $W_{red}$=8 and it is extended to the top by the averaged boundary signal bdryredu, e.g. as defined above. One may write $pred_{red}[x][-1]$ for the first line of predred. Then the signal $pred_{red}^{ups,ver}$ on a block of width $W_{red}$ and height $2*H_{red}$ may be given as $$pred_{red}^{ups,ver}[x][2*y+1] = pred_{red}[x][y],$$
$$pred_{red}^{ups,ver}[x][2*y] = (pred_{red}[x][y-1] + pred_{red}[x][y] + 1) >> 1,$$

where $0 \leq x < W_{red}$ and $0 \leq y < H_{red}$. The latter process may be carried out k times until $2^k * H_{red}$=H. Thus, if H=8 or H=16, it may be carried out at most once. If H=32, it may be carried out twice. If H=64, it may be carried out three times. Next, a horizontal upsampling operation may be applied to the result of the vertical upsampling. The latter upsampling operation may use the full boundary left of the prediction signal. Finally, if H=W, one may proceed analogously by first upsampling in the horizontal direction (if required) and then in the vertical direction.

This is an example of an interpolation using reduced boundary samples for the first interpolation (horizontally or vertically) and original boundary samples for the second interpolation (vertically or horizontally). Depending on the block size, only the second or no interpolation is required. If both horizontal and vertical interpolation is required, the order depends on the width and height of the block.

However, different techniques may be implemented: for example, original boundary samples may be used for both the first and the second interpolation and the order may be fixed, e.g. first horizontal then vertical (in other cases, first vertical then horizontal).

Hence, the interpolation order (horizontal/vertical) and the use of reduced/original boundary samples may be varied.

1.4 Illustration of an Example of the Entire ALWIP Process

The entire process of averaging, matrix-vector-multiplication and linear interpolation is illustrated for different shapes in FIGS. 5.1-5.4. Note, that the remaining shapes are treated as in one of the depicted cases.

1. Given a 4×4 block, ALWIP may take two averages along each axis of the boundary by using the technique of FIG. 5.1. The resulting four input samples enter the matrix-vector-multiplication 19. The matrices are taken from the set $S_0$. After adding an offset, this may yield the 16 final prediction samples. Linear interpolation is not necessary for generating the prediction signal. Thus, a total of (4*16)/(4*4)=4 multiplications per sample are performed. See, for example, FIG. 5.1.
2. Given an 8×8 block, ALWIP may take four averages along each axis of the boundary. The resulting eight input samples enter the matrix-vector-multiplication 19, by using the technique of FIG. 5.2. The matrices are taken from the set $S_1$. This yields 16 samples on the odd positions of the prediction block. Thus, a total of (8*16)/(8*8)=2 multiplications per sample are performed. After adding an offset, these samples may be interpolated, e.g., vertically by using the top boundary and, e.g., horizontally by using the left boundary. See, for example, FIG. 5.2.
3. Given an 8×4 block, ALWIP may take four averages along the horizontal axis of the boundary and the four original boundary values on the left boundary by using the technique of FIG. 5.3. The resulting eight input samples enter the matrix-vector-multiplication 19. The matrices are taken from the set $S_1$. This yields 16 samples on the odd horizontal and each vertical positions of the prediction block. Thus, a total of (8*16)/(8*4)=4 multiplications per sample are performed. After adding an offset, these samples are interpolated horizontally by using the left boundary, for example. See, for example, FIG. 5.3.

The transposed case is treated accordingly.

4. Given a 16×16 block, ALWIP may take four averages along each axis of the boundary. The resulting eight input samples enter the matrix-vector-multiplication 19 by using the technique of FIG. 5.4. The matrices are taken from the set $S_2$. This yields 64 samples on the odd positions of the prediction block. Thus, a total of (8*64)/(16*16)=2 multiplications per sample are performed. After adding an offset, these samples are interpolated vertically by using the top boundary and horizontally by using the left boundary, for example. See, for example, FIG. 5.4.

For larger shapes, the procedure may be essentially the same and it is easy to check that the number of multiplications per sample is less than two.

For W×8 blocks, only horizontal interpolation is necessary as the samples are given at the odd horizontal and each vertical positions. Thus, at most (8*64)/(16*8)=4 multiplications per sample are performed in these cases.

Finally for W×4 blocks with W>8, let Ax be the matrix that arises by leaving out every row that correspond to an odd entry along the horizontal axis of the downsampled block. Thus, the output size may be 32 and again, only horizontal interpolation remains to be performed. At most (8*32)/(16*4)=4 multiplications per sample may be performed.

The transposed cases may be treated accordingly.

According to the embodiments proposed below, the MIP modes are applied in a manner which renders the usage of MIP even more efficient than compared to the usage so far anticipated in the current VVC version. The embodiments relate to three different aspects which may be applied separately from each other or may be combined pairwise or altogether. Compared to the current VVC implementation, it is first proposed that all MIP modes, i.e. also the $0^{th}$ MIP mode, can be used in a transposed way where the parity of the mode determines the transposed condition. In doing so, the number of MIP modes for MipSizeId=0 may be reduced from 35 to 32 and to reduce the number of MIP modes for MipSizeId=1 from 19 to 16. The MIP-mode may then be coded with a fixed-length code for small blocks. Second, it is proposed to remove the restriction that MIP may not be used on blocks whose aspect ratio is greater or equal to four. Additionally, it is proposed to introduce a separate context for the MTS-index depending on the MIP flag.

It is reported that the proposed method yields −0.06% BD-rate change over the VTM-6.0 in the AI configuration and 0.04% BD-rate savings over the VTM-6.0 in the RA configuration if the proposed context is not added. Here, the encoder runtime is reported to be 101% for the AI configuration and to be 100% for the RA configuration. The decoder runtime is reported to be 100% for the AI configuration and to be 99% for the RA configuration. If furthermore the proposed context is added, it is reported that the proposed method yields −0.09% BD-rate change over the VTM-6.0 in the AI configuration and −0.05% BD-rate change over the VTM-6.0 in the RA configuration. Here, the encoder runtime is reported to be 100% for the AI configuration and to be 100% for the RA configuration. The decoder runtime is reported to be 101% for the AI configuration and to be 99% for the RA configuration.

It should be noted that the following description of the FIGS. 6 to 9 primarily describes features usable in a picture decoder or video decoder (i.e., an apparatus for decoding). However, it is clear, that any of the features described herein can also be used in the context of a picture encoder or video encoder.

Figure 6:
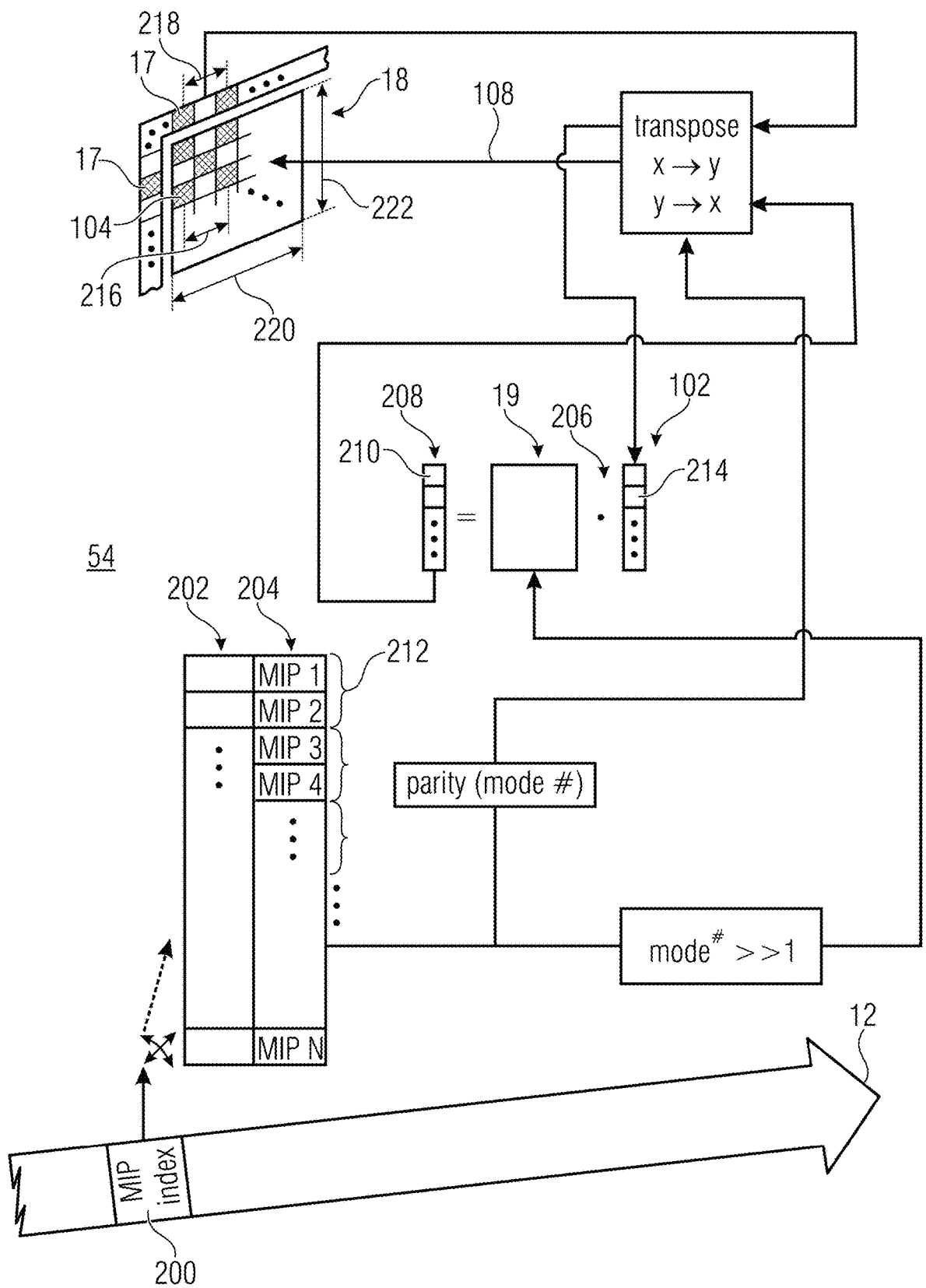
FIG. 6 shows a matrix-based intra prediction of a predetermined block of a picture based on a mode index, according to an embodiment.

FIG. 6 shows an apparatus 54 for decoding a predetermined block 18 of a picture using intra-prediction.

The apparatus 54 is configured to read, from a data stream 12, a mode index 200 using a binarization code 202, the mode index pointing to one out of a list 204 of matrix-based intra-prediction modes. The list 204 of matrix-based intra-prediction modes consists of an even number of matrix-based intra-prediction modes, wherein the matrix-based intra-prediction modes of the list 204 are grouped into pairs 212 of matrix-based intra-prediction modes. Each pair 212 consists of a first matrix-based intra-prediction mode and a second matrix-based intra-prediction mode. The apparatus 54 is configured to read, from the data stream 12, the mode index 200 using the binarization code 202 in a manner so that for each pair 212 of matrix-based intra-prediction modes the first matrix-based intra-prediction mode is assigned a first codeword and the second matrix-based intra-prediction mode is assigned a second codeword and both codewords are equal in length.

Optionally, the binarization code 202 is a variable length code, the variable length code comprises codewords of different lengths. Alternatively, the binarization code may be a truncated binary code and the number of matrix-based intra-prediction modes is not a power of two, so that the truncated binary code has codewords of different lengths. A matrix-based intra-prediction mode associated with a first pair 212 of matrix-based intra-prediction modes may be assigned a codeword different in length as a codeword assigned to matrix-based intra-prediction mode associated with a second pair 212 of matrix-based intra-prediction modes. However, both codewords of a pair 212 of matrix-based intra-prediction modes are equal in length.

According to an embodiment, the apparatus 54 may be configured to read the mode index 200 from the data stream 12 using an equi-probability bypass mode of a context adaptive binary arithmetic decoder.

Similarly, to the apparatus 54 (i.e. a decoder) for decoding the predetermined block 18 of the picture using intra-prediction, an apparatus (i.e. an encoder) for encoding the predetermined block 18 of the picture using intra-prediction can be configured to encode the mode index 200 into the data stream 12 using the binarization code 202 and optionally using the equi-probability bypass mode of a context adaptive binary arithmetic encoder.

The decoder and the encoder are configured to predict samples 108 of the predetermined block 18 by computing a matrix-vector product 206 between an input vector 102 derived from reference samples 17 in a neighbourhood of the predetermined block 18 and a prediction matrix 19 associated with the matrix-based intra-prediction mode k pointed to by the mode index 200. The computation of the matrix-vector product 206 results in an output vector 208. Furthermore, the samples 108 of the predetermined block 18 are predicted by associating components 210 of the output vector 208 obtained by the matrix-vector product 206 onto sample positions 104 of the predetermined block 18. This prediction of the samples 108 of the predetermined block 18 may be performed as described with regard to FIGS. 5.1 to 5.4.

For each pair 212 of matrix-based intra-prediction modes, the prediction matrix 19 associated with a first matrix-based intra-prediction mode of the respective pair 212 of matrix-based intra-prediction modes is equal to the prediction matrix 19 associated with a second matrix-based intra-prediction mode of the respective pair 212 of matrix-based intra-prediction modes. Thus, for matrix-based intra-prediction modes 2k and 2k+1, the same prediction matrix 19 is used. For each pair 212 of matrix-based intra-prediction modes, the encoder and the decoder are configured so that, if the matrix-based intra-prediction mode pointed to by the mode index 200 is the first matrix-based intra-prediction mode of the respective pair 212 of matrix-based intra-prediction modes, e.g. a mode with odd mode index 2k+1, an association of the reference samples 17 in the neighbourhood of the predetermined block 18 with components 214 of the input vector 112 and of the sample positions 104 of the predetermined block 18 with the components 210 of the output vector 208 is transposed relative to the association in case of the matrix-based intra-prediction mode pointed to by the mode index 200 being the second matrix-based intra-prediction mode of the respective pair 212 of matrix-based intra-prediction modes, e.g. a mode with even mode index 2k.

Figure 7:
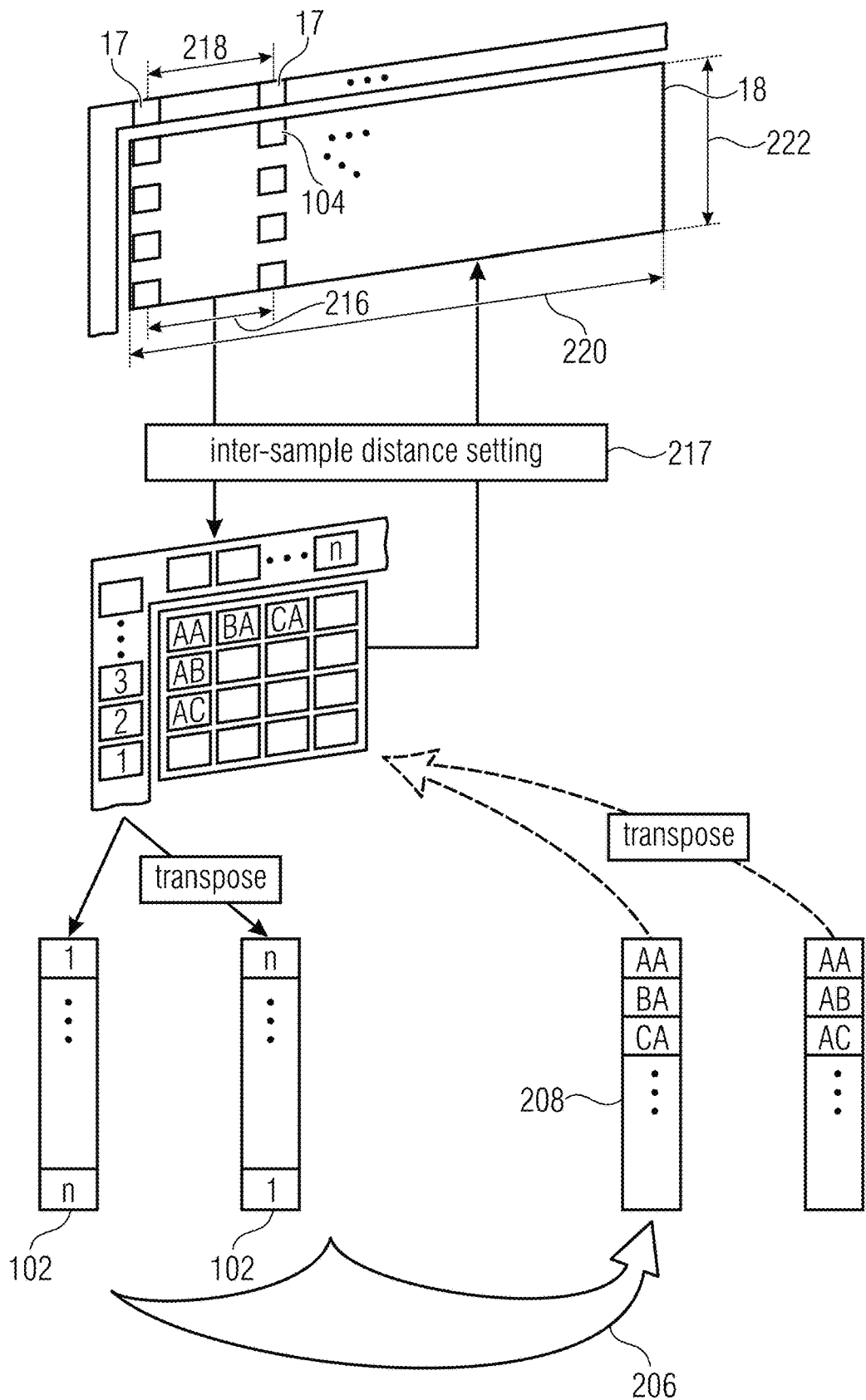
FIG. 7 shows a relationship between a pair of matrix-based intra prediction modes and an application of an inter-sample distance setting, according to an embodiment.

The decoder/encoder might be configured to determine whether the matrix-based intra-prediction mode pointed to by the mode index 200 is the first matrix-based intra-prediction mode of the respective pair of matrix-based intra-prediction modes or the second matrix-based intra-prediction mode of the respective pair 212 of matrix-based intra-prediction modes, based on the parity of the mode index 200. The parity of the mode index 200 might indicate whether the input vector 102 and the output vector 208 are used in a transposed way or not for the prediction of the samples 108 of the predetermined block 18. That is, as shown in FIG. 7, if a certain component of the components 1 to n of the input vector 102 is associated with position (x,y) with (0,0) denoting the upper left corner sample AA of the predetermined block 18 in the former case, then it is associated with (y,x) in the latter case. The same applies to the components (AA, AB, AC, BA, CA, . . . ) of the output vector 208.

Each pair 212 consists of a first matrix-based intra-prediction mode and a second matrix-based intra-prediction mode, which modes are related to each other by the same prediction matrix 19 and only differ among each other in terms of the input vector 102 and the output vector 208 being transposed or not. According to an embodiment, a last significant bit, i.e. a last bin, of the binarization code 202 or, as an alternative, a most significant bit, i.e. a first bin, of the binarization code 202—such as a truncated binary code or fixed length binary code—of the index 200, might indicate whether the MIP mode is to be used in a transposed way or not. Alternatively, or seen from a different perspective, the mode index is composed of a syntax element which represents a sub-index onto a pair of corresponding, mutually transposed MIP modes, which might also be binarized using a truncated binary code, with a fixed number of bits and an additional syntax element which represents a transposition flag, which additional syntax element indicates whether transposition is to be applied or not. In other words, the index 200 would be composed of a first syntax element indicting a MIP mode pair and an additional flag indicating whether the matrix underlying the MIP mode pair is to be applied in a transposed way or not. The additional bit or flag might be decoded/encoded from/into the data stream 12 before or after the sub-index syntax element is decoded/encoded from/into the data stream 12.

According to an embodiment, the decoder/encoder is configured to index the prediction matrix 19 out of a plurality of prediction matrices using the integer part of the mode index 200 divided by 2. This is based on the idea, that both matrix-based intra-prediction modes of a pair 212 use the same prediction matrix 19 for the prediction of the samples 108 of the predetermined block 18, for which reason the prediction matrix 19 is already sufficiently indicated by pointing with the mode index 200 to the relevant pair 212 in the list 204.

As shown in FIGS. 6 and 7, the decoder/encoder might be configured to set 217 an inter-sample distance 216 of the sample positions 104 of the predetermined block 18 and an inter-sample distance 218 of the reference samples 17 in the neighbourhood of the predetermined block 18 horizontally according to a first ratio of a horizontal dimension 220 of the predetermined block 18 relative to a horizontal default dimension and/or vertically according to a second ratio of a vertical dimension 222 of the predetermined block 18 relative to a vertical default dimension. This enables the usage of the list 204 of matrix-based intra-prediction modes for a plurality of block dimensions. The apparatus might fill spaces between the predicted samples by interpolation. The inter-sample distance setting 217 of the inter-sample distance 216 of the sample positions 104 of the predetermined block 18 and of the inter-sample distance 218 of the reference samples 17 in the neighbourhood of the predetermined block 18 enables an improved distribution of the predicted samples 108 in the predetermined block 18 and of the reference samples 17 in the neighbourhood of the predetermined block 18. Thus, the predicted samples might be equally distributed enabling an improved interpolation of samples of the predetermined block 18.

According to an embodiment, the decoder/encoder is configured to order the matrix-based intra-prediction modes in the list 204 of matrix-based intra-prediction modes equally for the plurality of block dimensions. Alternatively, the order might be adapted to, for instance, the block being wider than high or vice versa, i.e. higher than wide, or quadratic. This ordering may increase the coding efficiency and reduce the bitstream, since matrix-based intra-prediction modes for common block dimensions may be associated with short codewords and matrix-based intra-prediction modes for rare block dimensions may be associated with longer codewords.

Optionally, the plurality of block dimensions includes at least one block dimension corresponding to an aspect-ratio of larger than 4. The matrix-based intra-prediction might be optimized such that the predetermined block 18 with an aspect-ratio of the horizontal dimension 220 to the vertical dimension 222 is larger than 4. That is, the plurality of block dimensions includes a predetermined block with an at least four times larger horizontal dimension 220 than the vertical dimension 222 and/or a predetermined block with an at least four times larger vertical dimension 222 than the horizontal dimension 220. FIG. 7 might show a predetermined block 18 with a block dimension corresponding to an aspect-ratio of larger than 4.

In the current VVC working draft, for each block 18 on which MIP may be used, the number of MIP modes is an odd integer N=2n+1. Here, the 0-th mode may not be transposed while all other modes may be transposed: For i=n, MIP mode i is the transposed of MIP mode i-n. It is asserted that the restriction that the 0-th mode may not be transposed had originally been made due to the fact that in the first adopted version of MIP from the 15-th JVET meeting in Geneva, the MIP modes were signalled by an MPM (most-probable mode) scheme with 3 MPMs, [1]. In this scheme, the total number of MIP modes was an odd integer of the form $N=2^k+3$, where k is an integer. However, at the 16-th JVET meeting in Gothenburg, the latter signalization scheme for the MIP modes was replaced by a truncated binary code, [2]. It is asserted that as a consequence, the number of MIP modes does not need to be odd anymore and that thus the special treatment of the 0-th MIP mode regarding transposed can be removed.

Thus, it is proposed that in Clause 8.4.5.2.1 of the current VVC-draft, for an MIP-mode predModeIntra, the transposed flag isTransposed which determines whether the mode is transposed is defined as transposed_flag=predModeIntra&1.

Consequently, it is proposed that in Clause 8.4.5.2.1, the index modeId 200 which determines which matrix 19 is to be used for the given MIP mode predModeIntra is defined as modeId=predModeIntra>>1.

By this manner, signalling a mode and its transposed mode is equally expensive in terms of VLC length. No asymmetry results. No MPM list construction is necessary either.

Furthermore, is it proposed to reduce the number of MIP modes from 35 to 32 for MipSizeId=0 and from 19 to 16 for MipSizeId=1. For MipSizeId=2, it is proposed to use 12 instead of 11 MIP modes, since it is proposed that also the 0-th MIP mode can be transposed. Consequently, in the proposed method, 16 instead of 18 MIP matrices 19 are needed for MipSizeId=0 and 8 instead of 10 MIP matrices 19 are needed for MipSizeId=1. For MipSizeId=2, as before, 6 MIP matrices 19 are needed.

Next, in the current VVC working draft, MIP is excluded for blocks 18 whose aspect ratio is greater or equal to four. It is asserted that this restriction is unnecessary since the MIP of the current VVC works for these blocks 18 without any additional design changes. It is asserted that the restriction for MIP regarding the block shape was mainly made to save encoder runtime and that it is thus undesirable to be normative. Thus, it is proposed to remove the latter restriction on the usage of MIP and to allow MIP for all block shapes, as shown in FIG. 8.

Figure 8:
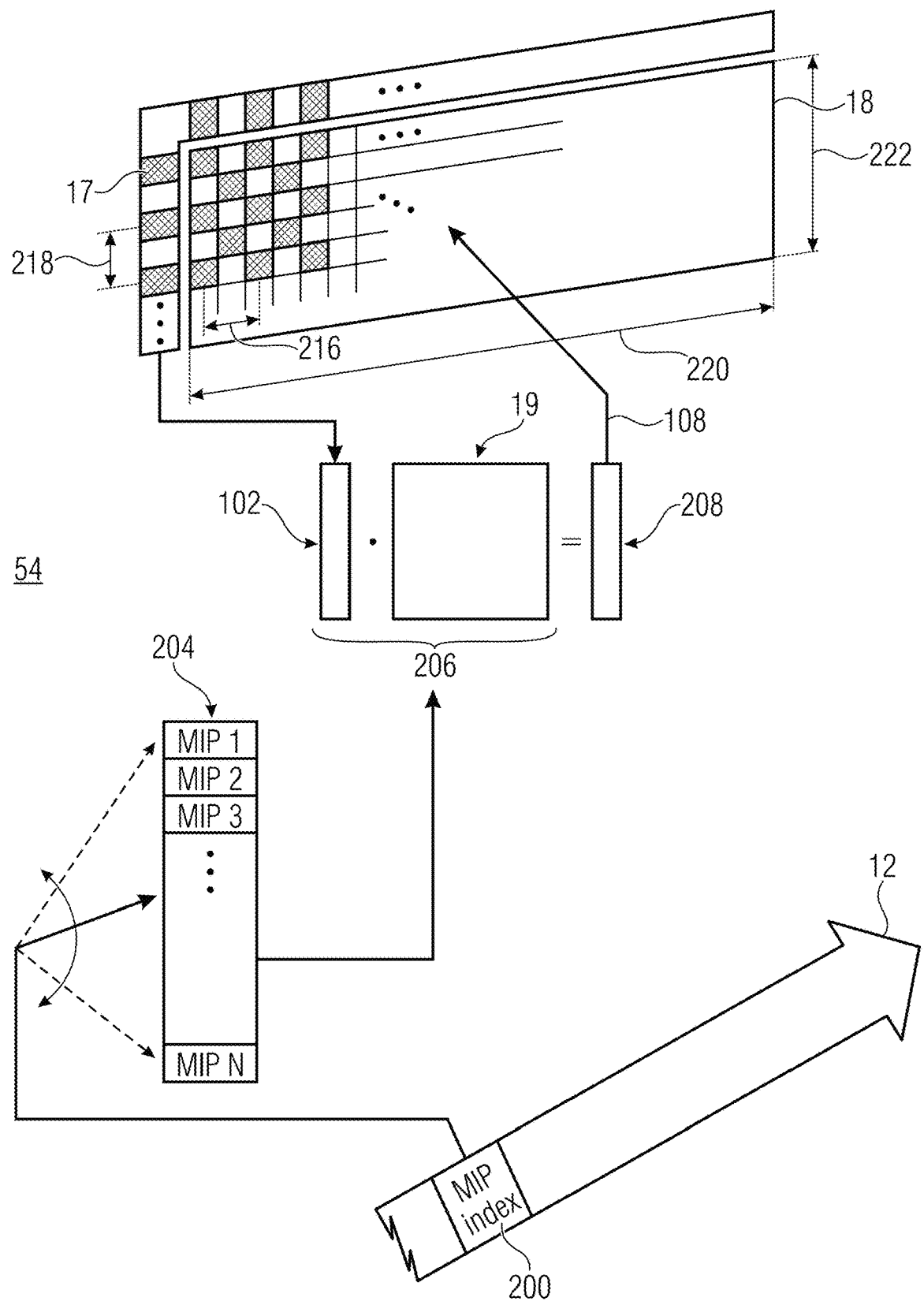
FIG. 8 shows a matrix-based intra prediction of a predetermined block with an aspect-ratio larger than four, according to an embodiment.

FIG. 8 shows an apparatus 54 for decoding a predetermined block of a picture using intra-prediction, configured to predict each of predetermined intra-predicted blocks 18 of the picture by reading, from a data stream 12, a mode index 200, the mode index 200 pointing to one out of a list 204 of matrix-based intra-prediction modes. The apparatus 54 is configured to predict samples 108 of the respective predetermined intra-predicted block 18 by computing a matrix-vector product 206 between an input vector 102 derived from reference samples 17 in a neighbourhood of the respective predetermined intra-predicted block 18 and a prediction matrix 19 associated with the matrix-based intra-prediction mode (k) pointed to by the mode index 200 and by associating components of an output vector 208 obtained by the matrix-vector product 206 onto sample positions 104 of the respective predetermined intra-predicted block 18. The predetermined intra-predicted blocks 18 comprise blocks an aspect-ratio of which is larger than 4.

Furthermore, the apparatus 54 might be configured to set an inter-sample distance 216 of the sample positions 104 of the respective predetermined intra-predicted block and an inter-sample distance 218 of the reference samples 17 in the neighbourhood of the respective predetermined intra-predicted block 18 horizontally according to a first ratio of a horizontal dimension 220 of the predetermined block 18 relative to a horizontal default dimension and/or vertically according to a second ratio of a vertical dimension 222 of the predetermined block relative to a vertical default dimension. Optionally, the apparatus 54 is configured to use the list of matrix-based intra-prediction modes for a plurality of block dimensions. According to an embodiment, the apparatus might be configured to order the matrix-based intra-prediction modes in the list 204 of matrix-based intra-prediction modes equally for the plurality of block dimensions or adapt the order to, for instance, the block being wider than high or vice versa or quadratic.

An apparatus (encoder) for encoding a predetermined block of a picture using intra-prediction can have the same or similar features as the apparatus 54 (decoder) for decoding a predetermined block of a picture using intra-prediction, wherein the encoder is configured to encode, into the data stream 12, the mode index 200.

According to an embodiment, the mode index 200 is read/encoded as described with regard to FIG. 6.

Optionally, the decoder/encoder is configured to perform the prediction of the samples 108 of the respective predetermined intra-predicted block 18 as described with regard to one of the FIGS. 5.1 to 7.

Figure 9:
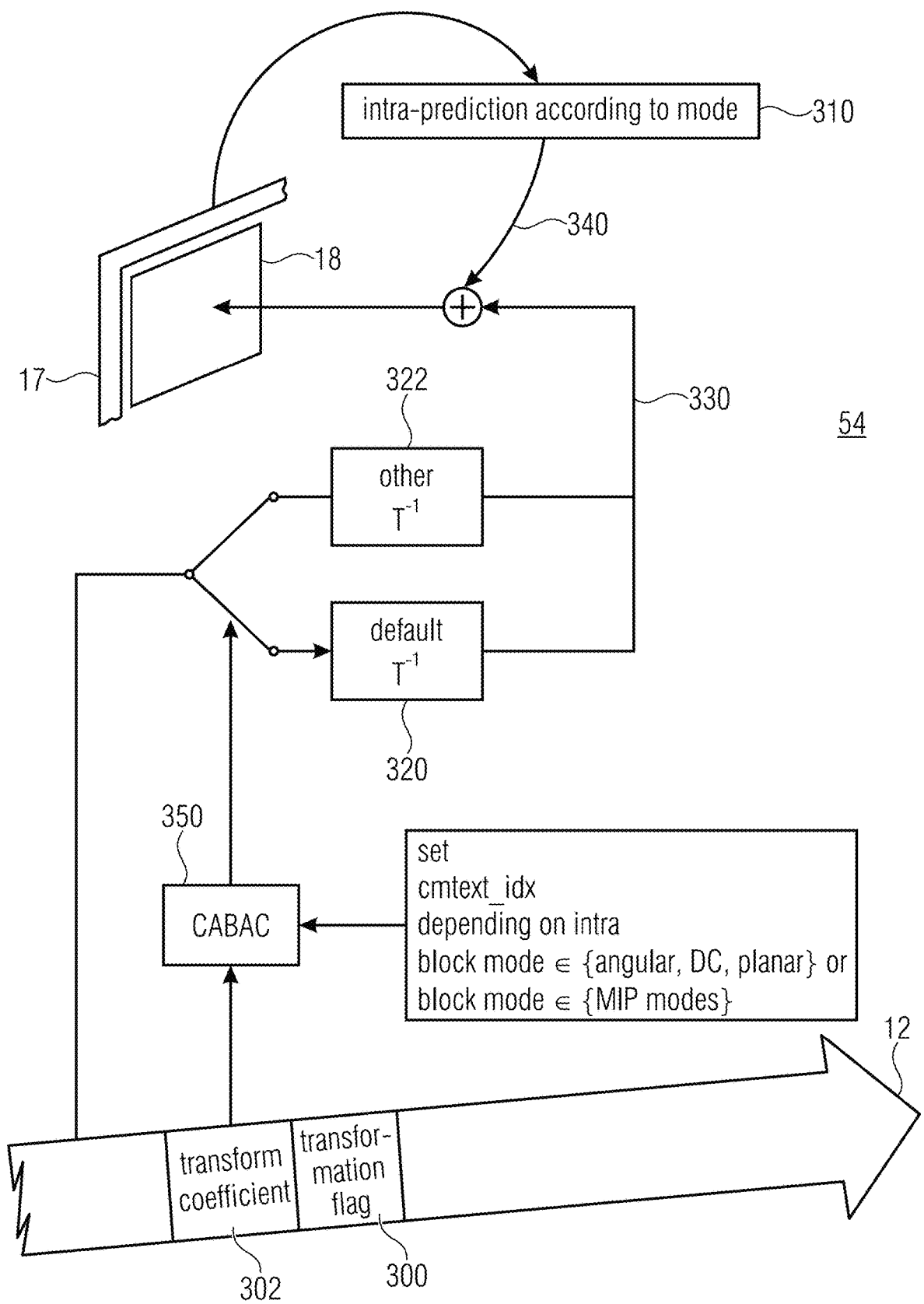
FIG. 9 shows a coding of a transformation flag using Context-Based Adaptive Binary Arithmetic Coding, according to an embodiment.

According to an embodiment, shown in FIG. 9, it is proposed to use a separate context for the MTS-flag, i.e. a transformation flag 300, if the corresponding coding unit, e.g. a predetermined intra-predicted block 18, is using MIP. The MTS flag 300 may indicate whether the residual transformation for that block 18 should be the default one, such as a DCT-II applied horizontally and vertically, or if not in which case subsequent syntax elements may optionally signal whether, for instance, a DST-VII or DCT-VIII is applied instead, vertically and/or horizontally. It is asserted that there is a statistical difference between the usage of MTS for MIP and for non-MIP blocks which can thus be exploited by separating the corresponding context. In particular, as MIP modes have to have been learned with a particular residual transform, here the default one, other transforms are more unlikely to yield better results than compared to heuristically designed modes such as the DC, planar and angular modes.

FIG. 9 shows an apparatus 54 for decoding a predetermined block 18 of a picture using intra-prediction.

The apparatus 54 is configured to predict 310 each of predetermined intra-predicted blocks 18, e.g. the MIP blocks, of the picture by reading, from a data stream 12, a mode index 200, the mode index 200 pointing to one out of a list 204 of matrix-based intra-prediction modes, and by predicting samples 108 of the respective predetermined intra-predicted block 18 by computing a matrix-vector product 206 between an input vector 102 derived from reference samples 17 in a neighbourhood of the respective predetermined intra-predicted block 18 and a prediction matrix 19 associated with the matrix-based intra-prediction mode (k) pointed to by the mode index 200 and associating components of an output vector 208 obtained by the matrix-vector product 206 onto sample positions 104 of the respective predetermined intra-predicted block 18. This intra-prediction 310 of the predetermined intra-predicted blocks 18 may be performed as described with regard to one of FIGS. 5.1 to 8. The apparatus 54 is configured to obtain a prediction signal 340 by this prediction 310.

Furthermore, the apparatus 54 is configured to predict 310 each of further predetermined intra-predicted blocks 18, e.g. "normal" intra blocks, of the picture using one out of a set of normal intra-prediction modes comprising an angular prediction mode, a DC prediction mode and a planar prediction mode to obtain a prediction signal 340.

For a predetermined block 18 out of the predetermined intra-predicted blocks and the further predetermined intra-predicted blocks, the apparatus 54 is configured to decode a transformation flag 300, e.g. MTS flag, from the data stream 12. This transformation flag 300 may be coded for both predetermined intra-predicted blocks and further predetermined intra-predicted blocks, i.e. MIP blocks and normal intra blocks. The transformation flag 300 indicates whether a prediction residual for the predetermined block 18 is coded into the data stream 12 using a default transformation 320 or a different transformation 322. The default transformation 320 might be a DCT-II applied horizontally and vertically and the different transformation 322 might be a DST-VII or a DCT-DCT-VIII horizontally and a DST-VII or DCT-DCT-VIII vertically.

The apparatus 54 is configured to decode the transformation flag 300 from the data stream 12 using context adaptive binary arithmetic coding 350 using a probability model selected depending on whether the predetermined block is one of the predetermined intra-predicted blocks or one of further predetermined intra-predicted blocks. Optionally, the apparatus 54 is configured to use as probability model for decoding the transformation flag 300 a first probability model and update the first probability model depending on the transformation flag 300 if the predetermined block 18 is one of the predetermined intra-predicted blocks and use as probability model for decoding the transformation flag a second probability model and update the second probability model depending on the transformation flag 300 if the predetermined block 18 is one of the further predetermined intra-predicted blocks.

According to an embodiment, the apparatus 54 is configured to, if the transformation flag 300 indicates that the prediction residual 302 for the predetermined block 18 is coded into the data stream 12 using the different transformation 322, decode one or more further syntax elements from the data stream 12 indicating the different transformation. The one or more further syntax elements may indicate the different transformation 322 out of a set of separable transforms using a first one of a DST-VII and a DCT-DCT-VIII horizontally and a second one of DST-VII and DCT-DCT-VIII vertically.

The apparatus 54 is configured to decode the prediction residual 302 for the predetermined block 18 from the data stream 12 and re-transform the prediction residual 302 using a reverse transformation which reverses the default transformation 320 if the transformation flag 300 indicates that the prediction residual 302 for the predetermined block 18 is coded into the data stream 12 using the default transformation 320, and which reverses the different transformation 322 if the transformation flag 300 indicates that the prediction residual 302 for the predetermined block 18 is coded into the data stream 12 using the different transformation 322, so as to obtain a prediction residual signal 330. The apparatus 54 is configured to correct the prediction signal 340 using the prediction residual signal 330.

An apparatus (encoder) for encoding a predetermined block of a picture using intra-prediction can have the same or similar features as the apparatus 54 (decoder) for decoding a predetermined block of a picture using intra-prediction, wherein the encoder is configured to perform the re-transform in a prediction loop.

According to an embodiment, the encoder is configured to encode the prediction residual 302 for the predetermined block 18 into the data stream 12 by transforming the prediction residual signal 330 using the default transformation 320 if the transformation flag 300 indicates that the prediction residual 302 for the predetermined block 18 is to be coded into the data stream 12 using the default transformation 320, and using the different transformation 322 if the transformation flag 300 indicates that the prediction residual 302 for the predetermined block 18 is to be coded into the data stream 12 using the different transformation 322, so as to obtain a transformed prediction residual signal. Furthermore, the encoder is configured to encode the transformed prediction residual signal into the data stream 12, so that the prediction signal 340 is correctable by a re-transform of the transformed prediction residual signal.

Additionally, the encoder is configured to encode the transformation flag 300 into the data stream 12 using context adaptive binary arithmetic coding 350 using the probability model selected depending on whether the predetermined block 18 is one of the predetermined intra-predicted blocks or one of further predetermined intra-predicted blocks.

The encoder and/or decoder may comprise features and/or functionalities as described with regard to one of the FIGS. 5.1 to 8.

In the tables depicted below, experimental results according to the common test conditions [3] and the test conditions of the CE for intra, [4], are presented. In Table 1 and Table 2, results are reported for the proposed cleanup but without the addition of the extra context for the MTS flag. In Table 3 and Table 4, results are reported for the proposed cleanup with the proposed addition of the extra context for the MTS flag. No optimizations at the encoder were made in comparison to the VTM-6.0 anchor in any of the tests.

TABLE 1

Result of the incorporated MIP changes: Reference is VTM-6.0 anchor, test is VTM-6.0 with the proposed cleanup and without the addition of the extra context, AI configuration

|  | Y | U | V | enc time | dec time |
|---|---|---|---|---|---|
| Class A1 | −0.08% | −0.03% | −0.03% | 101% | 101% |
| Class A2 | −0.06% | −0.04% | −0.06% | 101% | 101% |
| Class B | −0.07% | −0.08% | −0.12% | 100% | 101% |
| Class C | −0.03% | −0.18% | −0.01% | 101% | 97% |
| Class E | −0.09% | 0.08% | 0.02% | 100% | 99% |
| Overall | −0.06% | −0.06% | −0.05% | 101% | 100% |
| Class D | −0.02% | −0.04% | 0.07% | 101% | 99% |
| Class F | −0.03% | −0.05% | −0.01% | 100% | 100% |

TABLE 2

Result of the incorporated MIP changes: Reference is VTM-6.0 anchor, test is VTM-6.0 with the proposed cleanup and without the addition of the extra context, RA configuration

|  | Y | U | V | enc time | dec time |
|---|---|---|---|---|---|
| Class A1 | −0.03% | −0.11% | −0.12% | 100% | 100% |
| Class A2 | −0.02% | 0.12% | −0.07% | 101% | 97% |
| Class B | −0.05% | 0.03% | −0.12% | 101% | 100% |

TABLE 2-continued

Result of the incorporated MIP changes: Reference is VTM-6.0 anchor, test is VTM-6.0 with the proposed cleanup and without the addition of the extra context, RA configuration

|  | Y | U | V | enc time | dec time |
|---|---|---|---|---|---|
| Class C | −0.03% | 0.08% | −0.01% | 100% | 102% |
| Class E |  |  |  |  |  |
| Overall | −0.04% | 0.03% | −0.08% | 100% | 99% |
| Class D | −0.04% | −0.12% | −0.12% | 101% | 102% |
| Class F | −0.01% | −0.05% | 0.00% | 102% | 102% |

TABLE 3

Result of the incorporated MIP changes: Reference is VTM-6.0 anchor, test is VTM-6.0 with the proposed cleanup and with the addition of the extra context, AI configuration

|  | Y | U | V | enc time | dec time |
|---|---|---|---|---|---|
| Class A1 | −0.12% | −0.16% | −0.10% | 96% | 99% |
| Class A2 | −0.08% | −0.10% | −0.08% | 100% | 102% |
| Class B | −0.08% | −0.07% | −0.12% | 103% | 102% |
| Class C | −0.04% | −0.18% | −0.07% | 100% | 99% |
| Class E | −0.13% | −0.07% | −0.05% | 101% | 105% |
| Overall | −0.09% | −0.11% | −0.08% | 100% | 101% |
| Class D | −0.02% | 0.05% | −0.09% | 99% | 98% |
| Class F | −0.03% | −0.10% | −0.12% | 100% | 101% |

TABLE 4

Result of the incorporated MIP changes: Reference is VTM-6.0 anchor, test is VTM 6.0 with the proposed cleanup and with the addition of the extra context, RA configuration

|  | Y | U | V | enc time | dec time |
|---|---|---|---|---|---|
| Class A1 | −0.05% | −0.05% | −0.08% | 100% | 99% |
| Class A2 | −0.03% | −0.02% | 0.01% | 100% | 99% |
| Class B | −0.07% | 0.01% | −0.04% | 101% | 102% |
| Class C | −0.03% | 0.07% | −0.08% | 99% | 100% |
| Class E |  |  |  |  |  |
| Overall | −0.05% | 0.01% | −0.05% | 100% | 99% |
| Class D | −0.05% | −0.11% | 0.00% | 101% | 100% |
| Class F | −0.06% | 0.06% | −0.03% | 100% | 100% |

In the present application, an alignment of the transposed usage of the MIP modes and of the number of MIP modes with the newly adopted signalling of the MIP mode is proposed. Moreover, a cleanup regarding an unnecessary restriction for the usage of MIP is proposed. Finally, a separate context for the MTS index depending on the MIP flag is proposed. Any or all of these changes may favourably adopted into the next working draft of the VVC.

Implementation Alternatives:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] B. Bross et al., "Versatile Video Coding (Draft 5)", JVET-N1001-v8, Geneva, Switzerland, March 2019
[2] B. Bross et al., "Versatile Video Coding (Draft 6)", JVET-O2001, Gothenburg, Sweden, July 2019
[3] F. Bossen et al., "JVET common test conditions and software reference configurations for SDR video", JVET-N1010, Geneva, Switzerland, March 2019
[4] G. Van der Auwera et al., "Description of Core Experiment 3: Intra Prediction and Mode Coding", JVET-O2023, Gothenburg, Sweden, July 2019

The invention claimed is:

1. An apparatus for decoding a picture, wherein the apparatus comprises one or more processors configured to:
    for a first subset of intra-predicted blocks:
        decode a mode index from a data stream, wherein the mode index specifies a prediction matrix from a list of matrix-based intra-prediction modes,
        compute a matrix-vector product based on an input vector and the prediction matrix, and
        associate components of an output vector obtained from the matrix-vector product with sample positions of the first subset of intra-predicted blocks to obtain a first prediction signal;
    for a second subset of intra-predicted blocks, predict the second subset of intra-predicted blocks using one of an angular prediction mode, a DC mode, and a planar prediction mode to obtain a second prediction signal;
    for an intra-predicted block, decode a transformation flag from the data stream using context adaptive binary arithmetic coding based on a probability model selected according to whether the intra-predicted block is one of the first subset of intra-predicted blocks or one of the second subset of intra-predicted blocks, wherein the transformation flag indicates whether a prediction residual for the intra-predicted block is coded into the data stream using a default transformation or a different transformation;
    decode the prediction residual for the intra-predicted block from the data stream;
    transform the prediction residual using a reverse transformation to obtain a prediction residual signal; and
    correct the first prediction signal or the second prediction signal using the prediction residual signal.

2. An apparatus for decoding a picture, wherein the apparatus comprises one or more processors configured to:
    for a first subset of intra-predicted blocks:
        decode a mode index from a data stream, wherein the mode index specifies a prediction matrix from a list of matrix-based intra-prediction modes;

compute a matrix-vector product based on an input vector and the prediction matrix; and associate components of an output vector obtained from the matrix-vector product with sample positions of the first subset of intra-predicted blocks to obtain a first prediction signal;

for a second subset of intra-predicted blocks, predict the second subset of intra-predicted blocks using one of an angular prediction mode, a DC mode, and a planar prediction mode to obtain a second prediction signal;

for an intra-predicted block, decode a transformation flag from the data stream using context adaptive binary arithmetic coding based on a probability model selected according to whether the intra-predicted block is one of the first subset of intra-predicted blocks or one of the second subset of intra-predicted blocks, wherein the transformation flag indicates whether a prediction residual for the intra-predicted block is coded into the data stream using a default transformation or a different transformation;

decode the prediction residual for the intra-predicted block from the data stream;

transform the prediction residual using a reverse transformation to obtain a prediction residual signal; and correct the first prediction signal or the second prediction signal using the prediction residual signal.

3. The apparatus of claim 2, wherein the default transformation is a discrete cosine transform (DCT)-II applied horizontally and vertically.

4. The apparatus of claim 2, wherein the one or more processors are configured to decode one or more syntax elements from the data stream, wherein the one or more syntax elements indicate the different transformation when the transformation flag indicates that the prediction residual for the intra-predicted block is coded into the data stream using the different transformation.

5. The apparatus of claim 4, wherein the one or more syntax elements indicate the different transformation out of a set of separable transforms using a first one of a discrete sine transform (DST)-VII and a discrete cosine transform (DCT)-DCT-VIII horizontally and a second one of a DST-VII and a DCT-DCT-VIII vertically.

6. The apparatus of claim 2, wherein the probability model comprises a first probability model, and wherein the one or more processors are configured to update the first probability model based on the transformation flag when the intra-predicted block is one of the first subset of intra-predicted blocks.

7. The apparatus of claim 2, wherein the probability model comprises a second probability model, and wherein the one or more processors are configured to update the second probability model when the intra-predicted block is one of the second subset of intra-predicted blocks.

8. The apparatus of claim 2, wherein:
the input vector is derived from reference samples in a neighbor intra-predicted block neighboring the intra-predicted block,
the prediction matrix is associated with a matrix-based intra-prediction mode (k) indicated by the mode index,
the reverse transformation reverses the default transformation when the transformation flag indicates that the prediction residual for the intra-predicted block is coded into the data stream using the default transformation, and
the reverse transformation reverses the different transformation when the transformation flag indicates that the prediction residual for the intra-predicted block is coded into the data stream using the different transformation.

9. A method for decoding a picture, comprising:
for a first subset of intra-predicted blocks:
decoding a mode index from a data stream, wherein the mode index specifies a prediction matrix from a list of matrix-based intra-prediction modes;
computing a matrix-vector product based on an input vector and the prediction matrix; and
associating components of an output vector obtained from the matrix-vector product with sample positions of the first subset of intra-predicted blocks to obtain a first prediction signal;

for a second subset of intra-predicted blocks, predicting the second subset of intra-predicted blocks using one of an angular prediction mode, a DC mode, and a planar prediction mode to obtain a second prediction signal;

for an intra-predicted block, decoding a transformation flag from the data stream using context adaptive binary arithmetic coding based on a probability model selected according to whether the intra-predicted block is one of the first subset of intra-predicted blocks or one of the second subset of intra-predicted blocks, wherein the transformation flag indicates whether a prediction residual for the intra-predicted block is coded into the data stream using a default transformation or a different transformation;

decoding the prediction residual for the intra-predicted block from the data stream;

transforming the prediction residual using a reverse transformation to obtain a prediction residual signal; and correcting the first prediction signal or the second prediction signal using the prediction residual signal.

10. The method of claim 9, wherein the default transformation is a discrete cosine transform (DCT)-II applied horizontally and vertically.

11. The method of claim 9, further comprising decoding one or more syntax elements from the data stream, wherein the one or more syntax elements indicate the different transformation when the transformation flag indicates that the prediction residual for the intra-predicted block is coded into the data stream using the different transformation.

12. The method of claim 11, wherein the one or more syntax elements indicate the different transformation out of a set of separable transforms using a first one of a discrete sine transform (DST)-VII and a discrete cosine transform (DCT)-DCT-VIII horizontally and a second one of a DST-VII and a DCT-DCT-VIII vertically.

13. The method of claim 9, wherein the probability model comprises a first probability model, and wherein the method further comprises updating the first probability model based on the transformation flag when the intra-predicted block is one of the first subset of intra-predicted blocks.

14. The method of claim 9, wherein the probability model comprises a second probability model, and wherein the method further comprises updating the second probability model when the intra-predicted block is one of the second subset of intra-predicted blocks.

15. The method of claim 9, wherein:
the input vector is derived from reference samples in a neighbor intra-predicted block neighboring the intra-predicted block,
the prediction matrix is associated with a matrix-based intra-prediction mode (k) indicated by the mode index,
the reverse transformation reverses the default transformation when the transformation flag indicates that the prediction residual for the intra-predicted block is coded into the data stream using the default transformation, and the reverse transformation reverses the different transformation when the transformation flag indicates that the prediction residual for the intra-predicted block is coded into the data stream using the different transformation.

16. A non-transitory computer-readable storage medium storing instructions that, wherein executed by one or more processors, cause a decoding apparatus to:

for a first subset of intra-predicted blocks:
  decode a mode index from a data stream, wherein the mode index specifies a prediction matrix from a list of matrix-based intra-prediction modes;
  compute a matrix-vector product based on an input vector and the prediction matrix; and
  associate components of an output vector obtained from the matrix-vector product with sample positions of the first subset of intra-predicted blocks to obtain a first prediction signal;

for a second subset of intra-predicted blocks, predict the second subset of intra-predicted blocks using one of an angular prediction mode, a DC mode, and a planar prediction mode to obtain a second prediction signal;

for an intra-predicted block, decode a transformation flag from the data stream using context adaptive binary arithmetic coding based on a probability model selected according to whether the intra-predicted block is one of the first subset of intra-predicted blocks or one of the second subset of intra-predicted blocks, wherein the transformation flag indicates whether a prediction residual for the intra-predicted block is coded into the data stream using a default transformation or a different transformation;

decode the prediction residual for the intra-predicted block from the data stream;

transform the prediction residual using a reverse transformation to obtain a prediction residual signal; and correct the first prediction signal or the second prediction signal using the prediction residual signal.

17. The non-transitory computer-readable storage medium of claim 16, wherein the default transformation is a discrete cosine transform (DCT)-II applied horizontally and vertically.

18. The non-transitory computer-readable storage medium of claim 16, wherein the one or more processors are configured to decode one or more syntax elements from the data stream, wherein the one or more syntax elements indicate the different transformation when the transformation flag indicates that the prediction residual for the intra-predicted block is coded into the data stream using the different transformation.

19. The non-transitory computer-readable storage medium of claim 18, wherein the one or more syntax elements indicate the different transformation out of a set of separable transforms using a first one of a discrete sine transform (DST)-VII and a discrete cosine transform (DCT)-DCT-VIII horizontally and a second one of a DST-VII and a DCT-DCT-VIII vertically.

20. The non-transitory computer-readable storage medium of claim 16, wherein the probability model comprises a first probability model, and wherein the one or more processors are configured to update the first probability model based on the transformation flag when the intra-predicted block is one of the first subset of intra-predicted blocks.

21. The non-transitory computer-readable storage medium of claim 16, wherein the probability model comprises a second probability model, and wherein the one or more processors are configured to update the second probability model when the intra-predicted block is one of the second subset of intra-predicted blocks.

22. The non-transitory computer-readable storage medium of claim 16, wherein:

the input vector is derived from reference samples in a neighbor intra-predicted block neighboring the intra-predicted block, the prediction matrix is associated with a matrix-based intra-prediction mode (k) indicated by the mode index, the reverse transformation reverses the default transformation when the transformation flag indicates that the prediction residual for the intra-predicted block is coded into the data stream using the default transformation, and the reverse transformation reverses the different transformation when the transformation flag indicates that the prediction residual for the intra-predicted block is coded into the data stream using the different transformation.

* * * * *